INVENTORS.
LARRY A. GOSHORN
SHERRIL A. HARMON
BY
Ronald W. O'Keefe
ATTORNEY

| DECIMAL NUMBER | EQUIVALENT BINARY NUMBER |
|---|---|
| 0 | 000 |
| 1 | 001 |
| 2 | 010 |
| 3 | 011 |
| 4 | 100 |
| 5 | 101 |
| 6 | 110 |
| 7 | 111 |

FIG. 2

| BIT POSITION | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| BINARY NUMBER | 0 | 1 | 0 | 1 | 1 | 1 | 0 | 0 | 1 | 1 | 1 | 0 | 1 | 0 | 1 | 1 | 0 | 0 | 0 | 1 | 1 | 0 | 0 | 0 |
| EQUIVALENT OCTAL NUMBER | 2 | | | 7 | | | 1 | | | 6 | | | 5 | | | 4 | | | 3 | | | 0 | | |

FIG. 3

| COMMAND TYPE | OPERATION CODE 23 22 21 | OPERATION CODE 20 19 18 | INDEX BITS 17 16 15 | 14 | 13 12 11 10 9 8 7 6 5 4 3 2 1 0 |
|---|---|---|---|---|---|
| FULL OPERAND | | | | * | OPERAND ADDRESS |
| GEN 1 | 0 | 5 | | | MICROCODED |
| GEN 2 | 2 | 5 | | | MICROCODED |
| GEN 3 | 4 | 5 | | | MICROCODED |
| QUASI | 7 | 0-7 | | * | OPERAND ADDRESS |
| STEP FLOATING POINT | 0 | 1 | | | MICROCODED |

* RELATIVE ADDRESSING BIT

FIG. 4

Dec. 30, 1969 L. A. GOSHORN ET AL 3,487,370

COMMUNICATIONS CONTROL APPARATUS IN AN INFORMATION PROCESSING SYSTEM

Filed Dec. 22, 1966 22 Sheets-Sheet 3

Dec. 30, 1969 L. A. GOSHORN ET AL 3,487,370

COMMUNICATIONS CONTROL APPARATUS IN AN INFORMATION PROCESSING SYSTEM

Filed Dec. 22, 1966 22 Sheets-Sheet 4

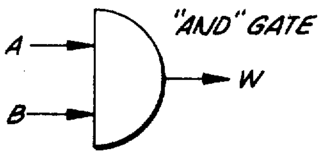
Fig. 8a
"AND" GATE TRUTH TABLE
| A | B | W |
|---|---|---|
| 0 | 0 | 0 |
| 1 | 0 | 0 |
| 0 | 1 | 0 |
| 1 | 1 | 1 |
Fig. 8b
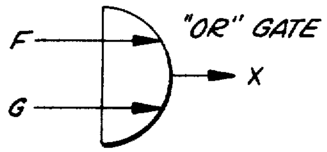
Fig. 9a
"OR" GATE TRUTH TABLE
| F | G | X |
|---|---|---|
| 0 | 0 | 0 |
| 1 | 0 | 1 |
| 0 | 1 | 1 |
| 1 | 1 | 1 |
Fig. 9b
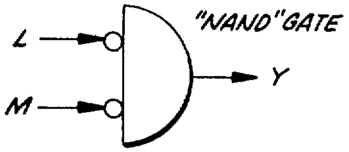
Fig. 10a
"NAND" GATE TRUTH TABLE
| L | M | Y |
|---|---|---|
| 0 | 0 | 1 |
| 0 | 1 | 1 |
| 1 | 0 | 1 |
| 1 | 1 | 0 |
Fig. 10b
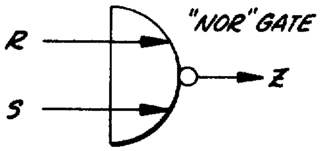
Fig. 11a
"NOR" GATE TRUTH TABLE
| R | S | Z |
|---|---|---|
| 0 | 0 | 1 |
| 1 | 0 | 0 |
| 0 | 1 | 0 |
| 1 | 1 | 0 |
Fig. 11b
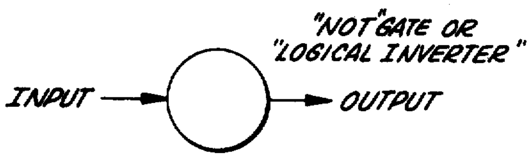
Fig. 12a
"NOT" GATE OR LOGICAL INVERTER" TRUTH TABLE
| INPUT | OUTPUT |
|---|---|
| 1 | 0 |
| 0 | 1 |
Fig. 12b

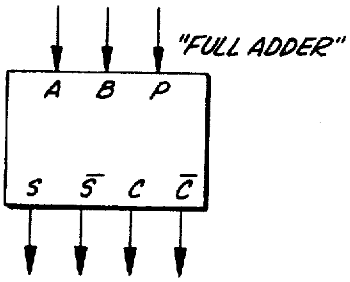
FIG. 13a
"FULL ADDER" CHARACTERISTIC TABLE
| A | B | P | S | $\bar{S}$ | C | $\bar{C}$ |
|---|---|---|---|---|---|---|
| 0 | 0 | 0 | 1 | 0 | 1 | 0 |
| 0 | 0 | 1 | 0 | 1 | 1 | 0 |
| 0 | 1 | 0 | 0 | 1 | 1 | 0 |
| 0 | 1 | 1 | 1 | 0 | 0 | 1 |
| 1 | 0 | 0 | 0 | 1 | 1 | 0 |
| 1 | 0 | 1 | 1 | 0 | 0 | 1 |
| 1 | 1 | 0 | 1 | 0 | 0 | 1 |
| 1 | 1 | 1 | 0 | 1 | 0 | 1 |
FIG. 13b
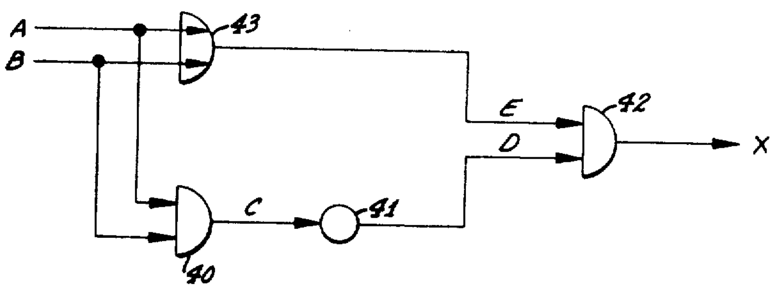
FIG. 14
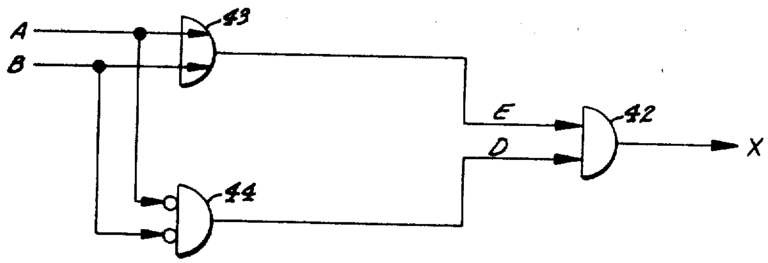
FIG. 15

| STATES OF TIME COUNTER SEQUENCE FLIP-FLOPS F1TCSA | F1TCSB | F1TCSC | TIMING SIGNALS WHICH ARE "ONE" | | EQUATIONS FOR THE PULSES WHICH ADVANCE THE TIME COUNTER TO ITS NEXT STATE |
|---|---|---|---|---|---|
| 0 | 0 | 0 | TT0E | TCTS | $(\overline{TCSA})(\overline{TCSB})(TCKA)$ |
| 0 | 0 | 1 | TT1E | TCTS | $(\overline{TCSA})(\overline{TCSB})(TCKA)$ |
| 0 | 1 | 0 | TT2E | TCTS | $(TT2E)(TCKA)(CDRA+\overline{MREQ}+IRMS)$ |
| 1 | 1 | 0 | TT3E | TCTA | $(TCKA)(TT3E)$ |
| 1 | 0 | 0 | TT4E | TCTA | $(TLPS)$ |

FIG. 17

NORMAL SEQUENCE CONTROL STATE 1

NORMAL SEQUENCE CONTROL STATE 2

Dec. 30, 1969 L. A. GOSHORN ET AL 3,487,370

COMMUNICATIONS CONTROL APPARATUS IN AN INFORMATION PROCESSING SYSTEM

Filed Dec. 22, 1966 22 Sheets-Sheet 10

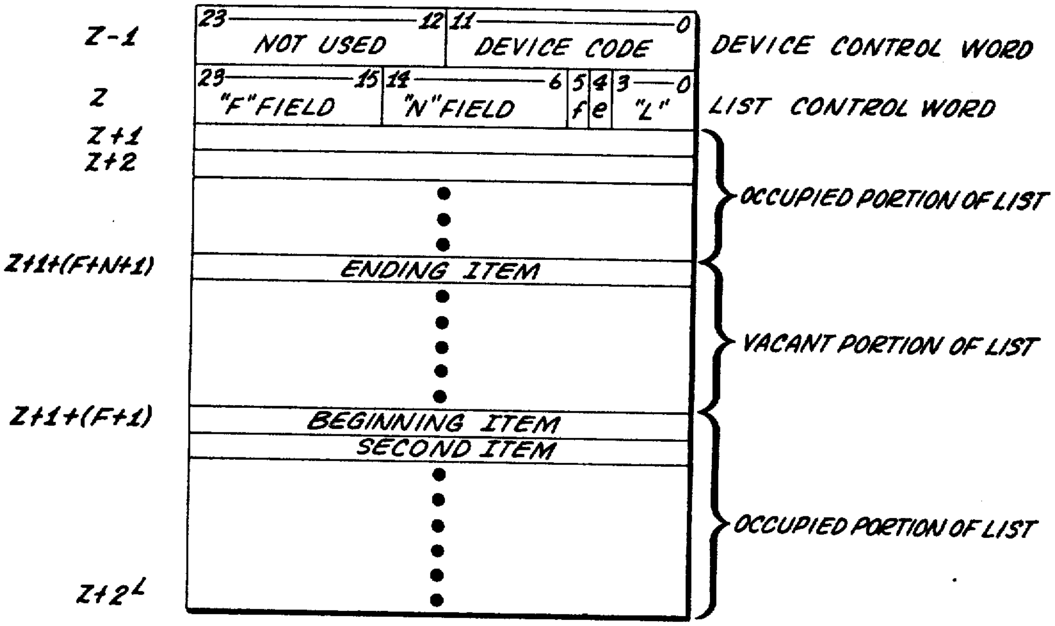
FIG. 22a
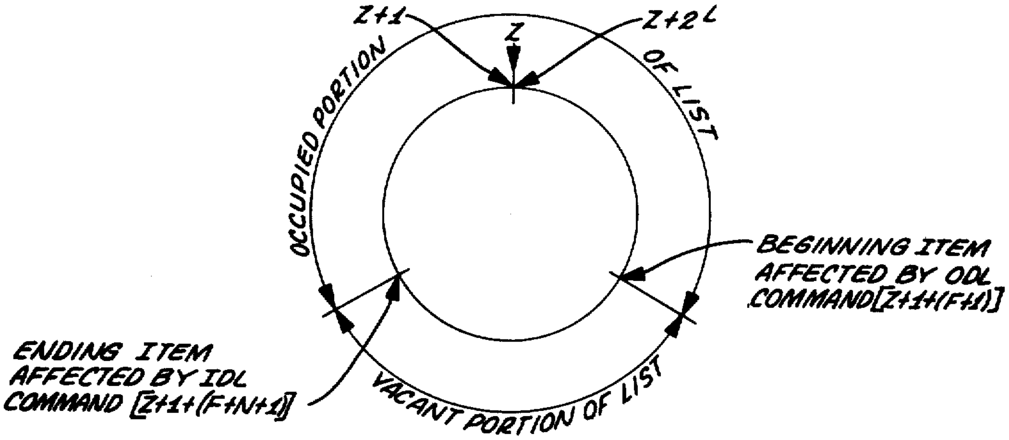
FIG. 22b
| COMMAND | "F" FIELD MODIFICATION | "N" FIELD MODIFICATION | AFFECTED STORAGE LOCATION (Z IS LIST CONTROL WORD ADDRESS) |
|---|---|---|---|
| IDL | F → F | N+1 → N | Z+1+(F+N+1) |
| ODL | F+1 → F | N-1 → N | Z+1+(F+1) |
FIG. 22c Dec. 30, 1969 L. A. GOSHORN ET AL 3,487,370

COMMUNICATIONS CONTROL APPARATUS IN AN INFORMATION PROCESSING SYSTEM

Filed Dec. 22, 1966 22 Sheets-Sheet 14

TIMING DIAGRAM - IDL COMMAND

TIMING DIAGRAM-ODL COMMAND

J COUNTER

SEQUENCE CONTROL STATE 3 FIG. 35

SEQUENCE CONTROL STATE 3

FIRST SEQUENCE CONTROL STATE 4 -IDL AND ODL COMMANDS

FIRST SEQUENCE CONTROL STATE 5 IDL AND ODL COMMANDS

SECOND SEQUENCE CONTROL STATE 3-IDL AND ODL COMMANDS

SECOND SEQUENCE CONTROL STATES 4 AND 5 ODL COMMAND 3,487,370

COMMUNICATIONS CONTROL APPARATUS IN AN INFORMATION PROCESSING SYSTEM

Larry A. Goshorn, Villa Park, Calif., and Sherril A. Harmon, Phoenix, Ariz., assignors to General Electric Company, a corporation of New York Filed Dec. 22, 1966, Ser. No. 603,943
Int. Cl. G11b *13/00*
U.S. Cl. 340—172.5 10 Claims

ABSTRACT OF THE DISCLOSURE

After description of an information processing system, apparatus for providing communication between a memory unit and any one of a plurality of peripheral buffers thereof is related. A list command word in the arithmetic unit of the processing system includes a field specifying an address in the memory unit for a list control word and a field specifying a command to transfer an information item in a particular direction between a peripheral buffer and the list. The list control word provides four fields defining the current status of the list, including the maximum length, the number of items currently stored in the list, and whether the list is currently full or empty, and in addition provides a fifth field for developing the address of a storage location in memory of the beginning list item. In response to the command of the list command word, apparatus is provided to employ the fields of the list control word to develop by variable-modulo arithmetic the address of a particular storage location in memory with which a peripheral buffer is to communicate, and apparatus is provided to develop the address of a device code word specifying a particular peripheral buffer. From the device code, apparatus is provided to select a communication channel between the selected peripheral buffer and the selected storage location in memory and to transfer in response to the device command an information item therebetween. Furthermore, apparatus is provided to simultaneously update the list control word during execution of the list command and to restore it to memory.

This invention relates to an electronic information processor and, more particularly, to apparatus for establishing information flow between input/output devices and memory in an electronic information processor without passing the information through the primary or secondary accumulator registers of the information processor.

Electronic information processing systems may be roughly divided, according to one set of criteria, into two basic groups; viz. non-real time and real time. The distinction is found mainly in the character of reaction required in response to detected contemporaneous events which occur either inside or outside an information processing system. A non-real time information processing system need not necessarily respond to the occurrence of an event within its influence time. Often, however, a real time information processing system must so respond to avoid undesirable or even catastrophic consequences which could otherwise follow the event.

An example of a real time information processing system is a process computer. Process computers are used to monitor and/or control industrial processes or the like. They are real time information processors because they are required to detect events and alter their information flow accordingly to provide output signals which may institute remedial action, sound alarms, or provide some other appropriate response within the influence time of the event. For example, a process computer may be utilized for controlling a steam turbine electric power generating unit for an electric utility. In such a control, unusual conditions on the output line may automatically cause the normal generator protection apparatus to remove the generator from the line. As a consequence, the prime moving turbine tends to speed up very quickly because it is no longer heavily loaded by, and frequency-slaved to, the power grid but is nonetheless still supplied with a vast amount of steam. To keep the turbine and generator from overspeeding, which could cause catastrophic damage, safety valves in the steam supply lines automatically open under these conditions. The process computer must detect these and a myriad of related events and respond quickly to restore the system to a safe condition by analyzing the events and their sequence and issuing appropriate output signals which may cause valves to be opened or closed, breakers to be actuated, alarms to be sounded, etc., to effect a complete shutdown or to prepare the unit for a restart.

In general, a typical process for which process computer control and/or monitoring is contemplated is characterized by the occurrence of many such events or subprocesses, some occurring continuously, some occurring periodically, and others occurring randomly. Hence, a real time information processor is required to perform many functions, seemingly simultaneously. However, a digital computer is by nature a serial device when considered at the instruction level; that is, it can perform its program steps only in a serial fashion, one by one. It is by virtue of the extreme speed at which it operates that a digital computer can be successfully employed in process control and/or monitoring applications. In order that a process computer program may be able to serve the functional needs of the controlled or monitored process, a priority system must be established for the many system functions. Simultaneous occurrence of certain combinations of events may then require a temporary reassignment of priorities. As a consequence of these requirements, real-time programs are distinctively different from their non-real-time counterparts.

A real-time computer program becomes in reality a system of programs which service the process functions in accordance with an established priority scheme. These programs operate under an "executive control" program in such a manner that they interrupt one another as the changing process requirements dictate. There must, of course, be an underlying order in the seeming chaos which results from the interaction of so many programs. Thus, it is an inherent requirement of the executive control program that it perform efficiently a large amount of "bookkeeping" or "housekeeping" functions. Indeed, the housekeeping functions, necessary to some degree in all computer programs, prove to be of primary importance in a real time system program.

It becomes apparent that in the creation of real time information processing apparatus, cognizance must be given to the unique requirements of real time programs which distinguish them from programs written for non-real time information processing applications. At the same time, an advancement in the art which improves real time performance may find important utility in a non-real time environment where the advancement is one of time and/or power efficiency.

For real time information processing systems, a need has existed for means to effect the transfer of information between input/output devices, such as typewriters, paper tape readers and punches, bulk storage devices, etc., and the system main memory in response to a single command and without disturbing information stored within a principal accumulator register which is used, in one form or another, with all electronic information processors.

The present invention provides this capabilty by automatically establishing direct communication paths between input/output buffers and circular lists in the system main memory in response to signals generated from the decoding of unique commands and according to the state of the selected buffer, the state of a specified input/output device associated with the buffer, and the status of the circular list in memory identified with that device.

Apparatus for providing the capability of circular listing is described in our copending patent application Ser. No. 596,666 filed Nov. 23, 1966, and assigned to the assignee of the present invention. Briefly, circular listing incorporates the storage of more or less related items in a manner in which an entire list shares a common address in the system main memory. The specified address contains a List Control Word which defines the maximum length of the list, the memory storage location of a beginning item of the list relative to the memory storage location of the List Control Word, the current number of items in the list, and whether the list is empty, full, or neither.

With the present invention, a Device Control Word is stored in a memory storage location numerically adjacent that of the List Control Word. A command which is to bring about a transfer of information between an input/output device and its list contains an operand address to the List Control Word. The device selection, the change in the contents of the list, and the reflected change in the List Control Word are brought about automatically without the execution of additional commands and without disturbing the contents of the principal or secondary accumulator registers or their equivalents.

It is one object of this invention to provide apparatus to implement direct intercourse between input/output devices and the main memory of an information processing system.

It is a more specific object of this invention to provide apparatus responsive to control signals to selectively permit intercourse between input/output devices and circular lists in main memory by addressing a List Control Word stored within memory during the execution of Device commands.

The foregoing objects are achieved, according to one embodiment of the instant invention, by providing apparatus responsive to signals decoded from Device command words, which command words have an operand address portion specifying the address of a List Control Word; and by the further provision of means whereby the decoded signals initiate a sequence of operations including the transfer of the List Control Word from its storage location in main memory to the information processer arithmetic and control unit. The List Control Word is decoded to determine the current status of the list it represents. Additional apparatus is provided responsive to signals decoded from the List Control Word to update the List Control Word in accordance with the specific operation carried out. According to which Device command is executed, the portions of the List Control Word which specify the relative address of the beginning item of the list and the number of items currently in the list are individually incremented or decremented by a count of one or are unchanged. If the list becomes full or empty upon execution of a Device command, third or fourth fields of the List Control Word are modified to indicate this current condition. Apparatus is also provided to automatically restore the modified List Control Word into its assigned storage location in main memory if the Device command can be successfully executed. Additional apparatus is provided to transfer the Device code associated with an addressed List Control Word from a predetermined memory storage location, relative to that of the List Control Word, into the information processer arithmetic and control unit. The Device code is decoded to determine a specific channel to be enabled between the arithmetic and control unit and a peripheral control input/output buffer with which the selected external peripheral device is in communication. In addition, apparatus is provided to transfer program control to one or the other of two alternate main memory storage locations according to whether the appendage or removal was successful or unsuccessful.

The subject matter of the invention is particularly pointed out and distinctly claimed in the concluding portion of the specification. The invention, however, both as to organization and method of operation, may be best understood by reference to the following description taken in connection with the accompanying drawings, in which:

FIGURE 2 is a table showing the relationship between decimal numbers and binary numbers;

FIGURE 3 is a table showing the relationship between binary numbers and octal numbers with reference to a word comprising twenty-four binary digits;

FIGURE 4 is a symbolic diagram illustrating the format of the various command words employed in the system of FIGURE 1;

Figure 1:
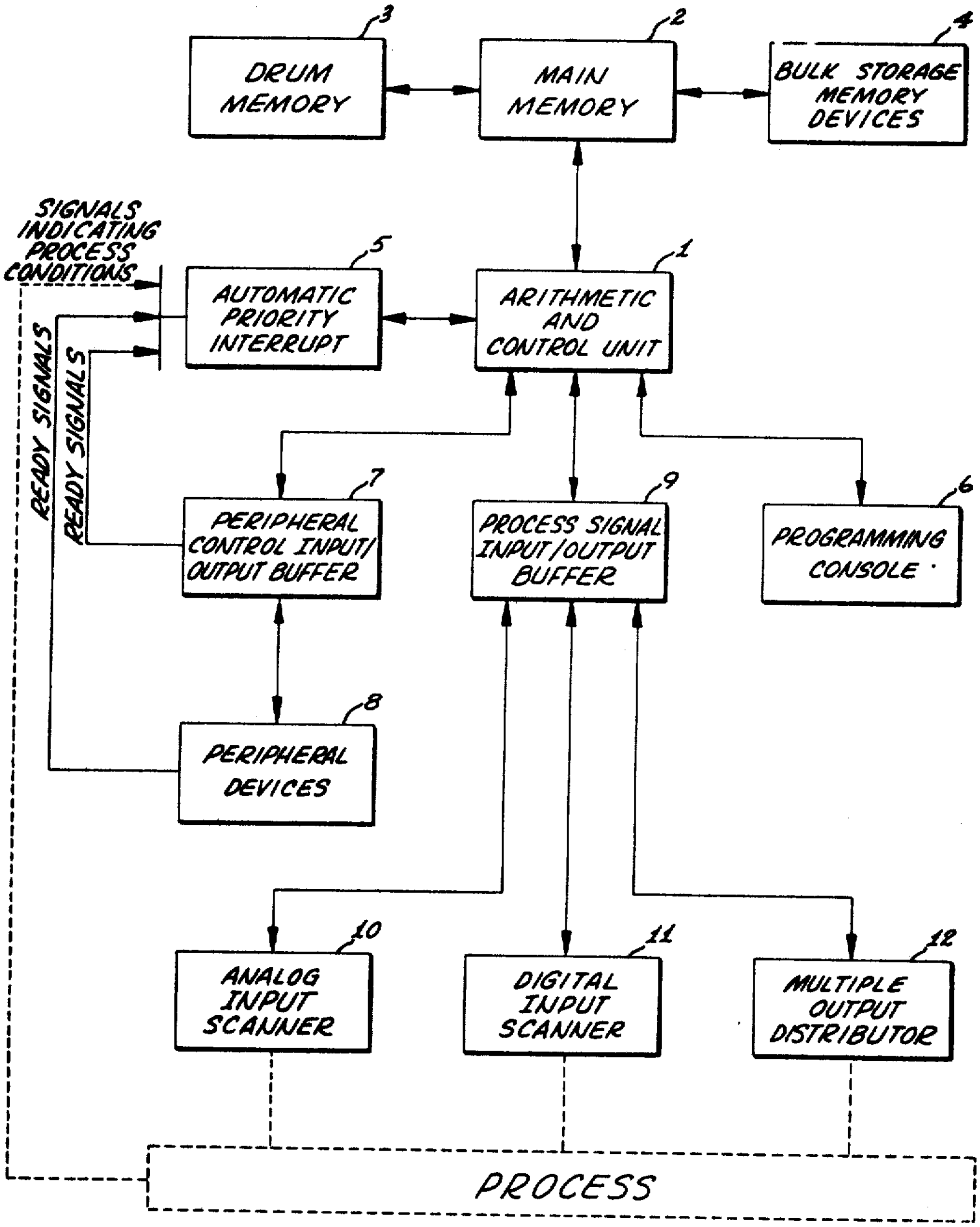
FIGURE 1 is a block diagram of an information processing system to which the instant invention is applicable.
Figure 5:
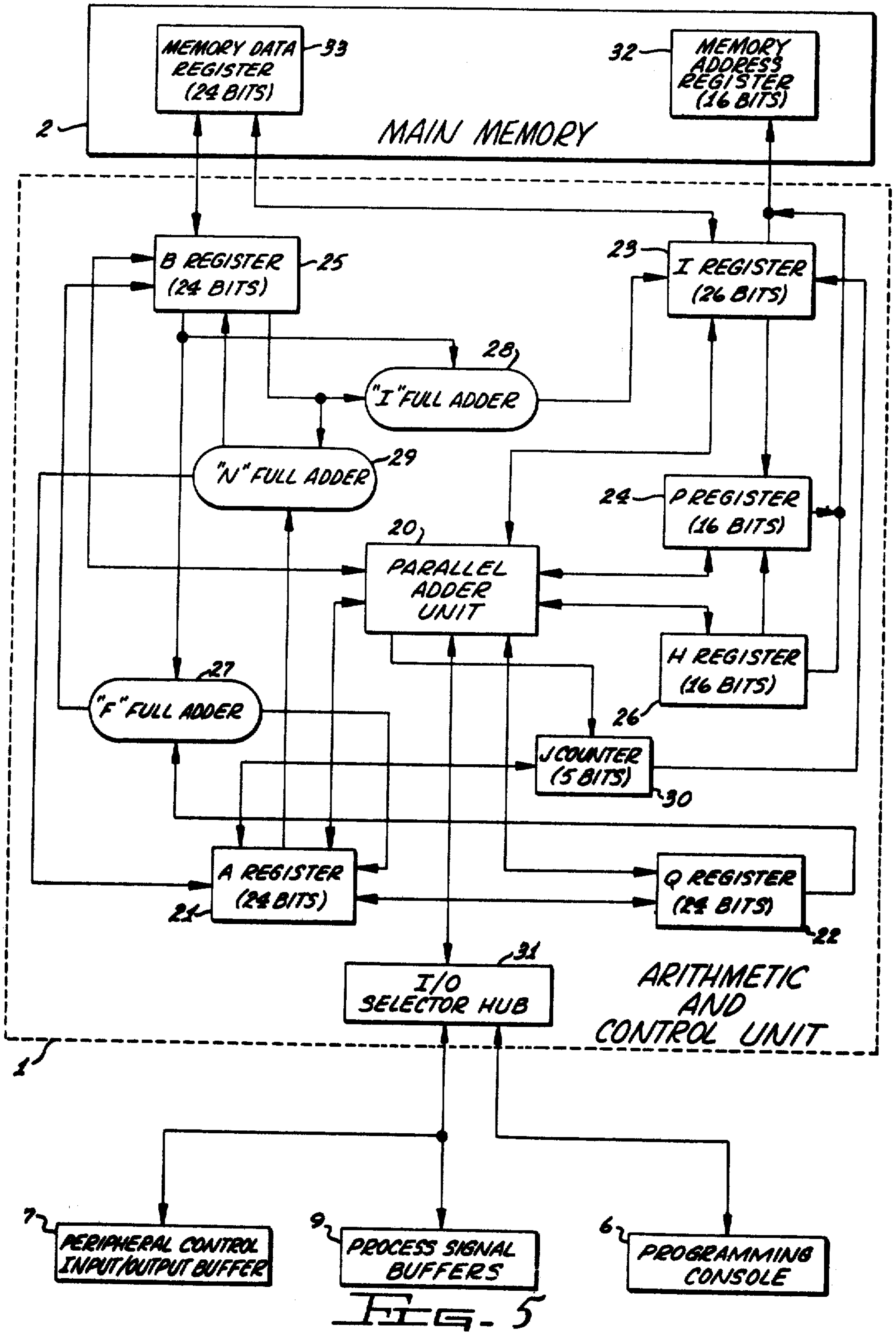
FIGURE 5 is a block diagram of the arithmetic and control unit utilized in the information processing system of FIGURE 1.
Figure 6A:
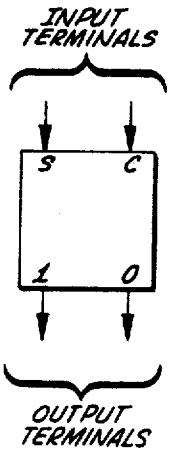
Figure 6B:
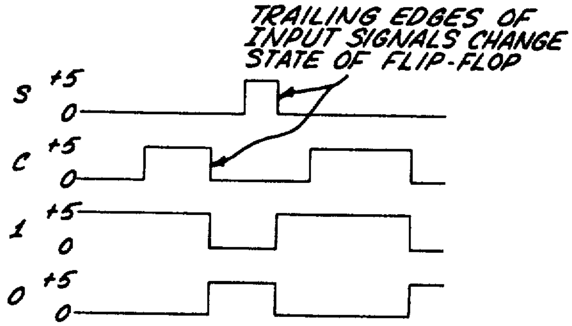
Figure 7A:
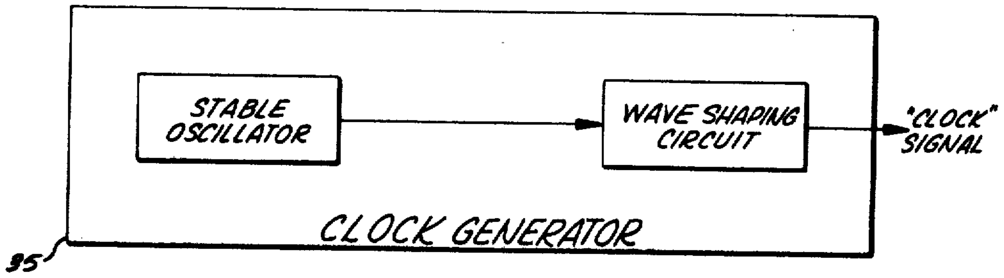
Figure 7B:
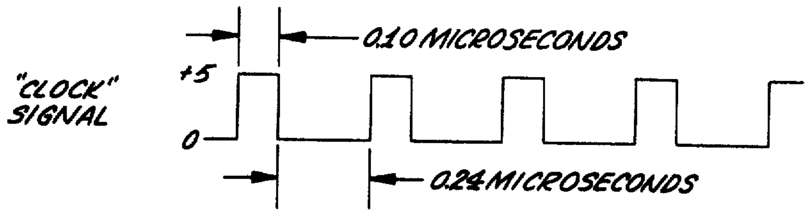
Figure 16:
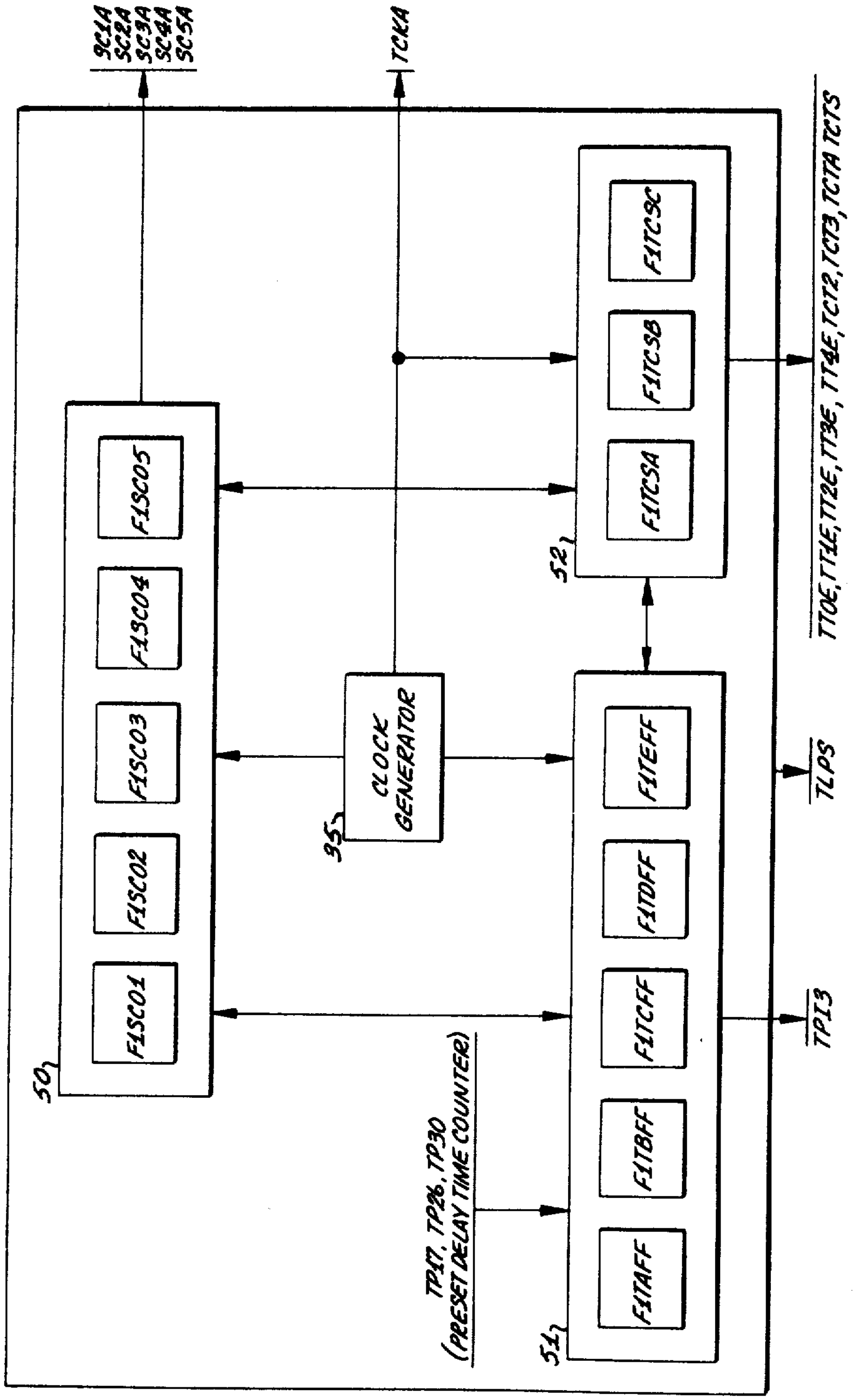
Figure 18:
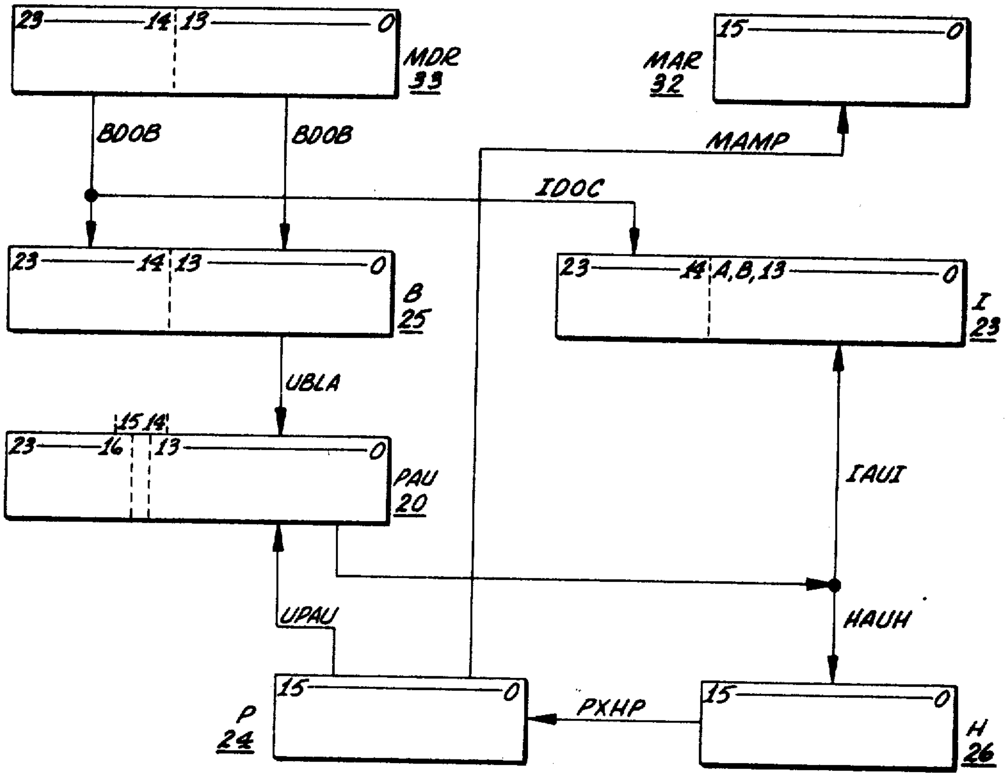
Figure 19:
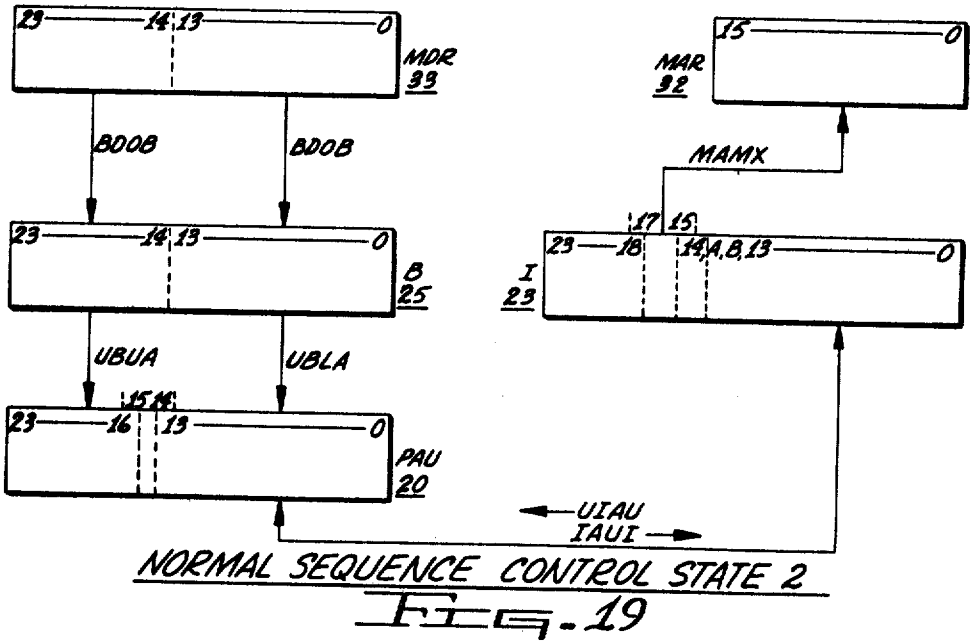
Figure 20:
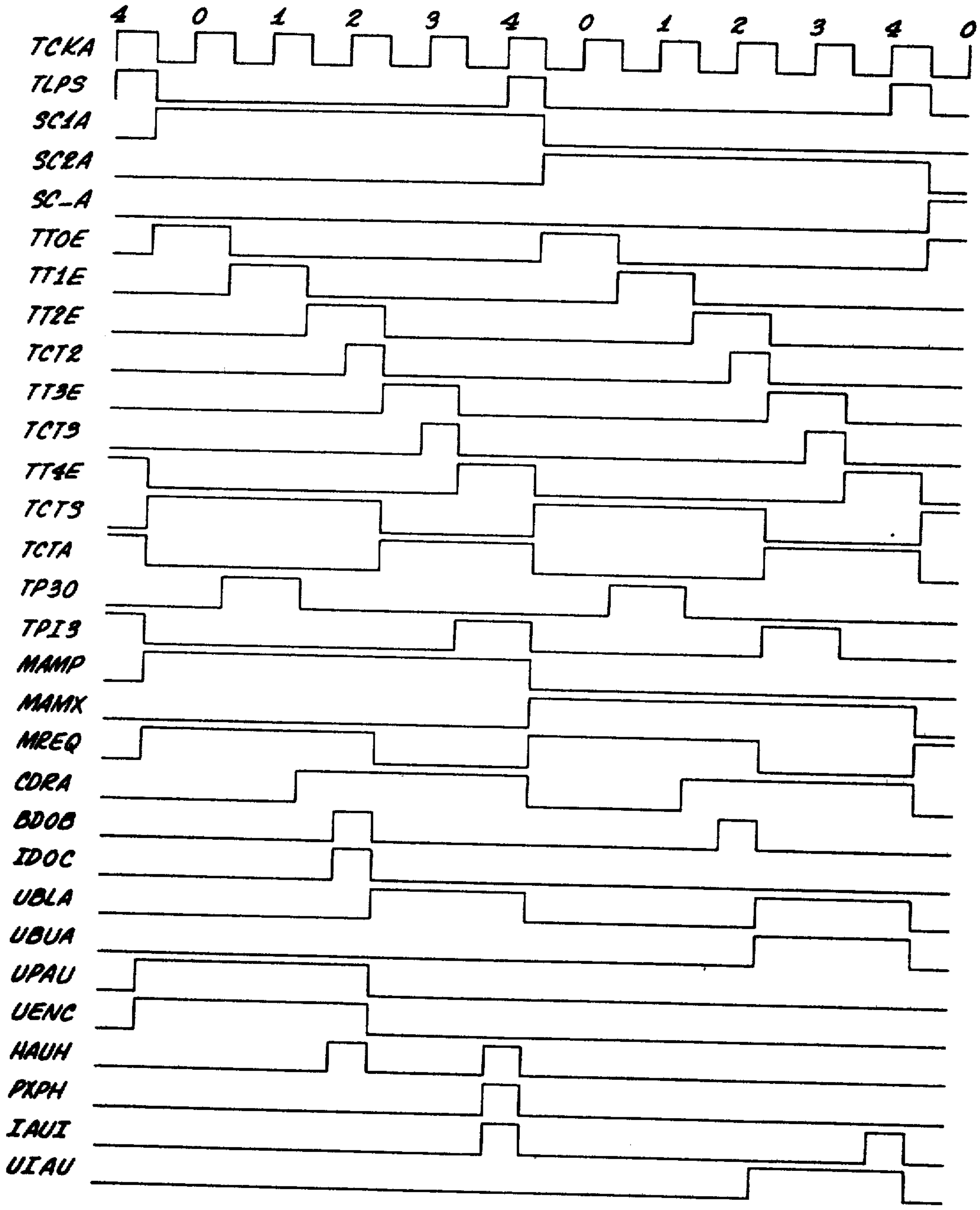

FIGURE 6*a* is a logic symbol for a Flip-Flop, and FIGURE 6*b* is a diagram showing the relationship between the input and output signals of the Flip-Flop of FIGURE 6*a*;

FIGURE 7*a* is a block diagram of a clock signal generator utilized in the information processing system of FIGURE 1, and FIGURE 7*b* is a voltage/time diagram of the output of the clock signal generator of FIGURE 7*a*;

FIGURE 8*a* is a logic symbol for an AND gate, and FIGURE 8*b* is a truth table for the AND gate of FIGURE 8*a*;

FIGURE 9*a* is a logic symbol for an OR gate, and FIGURE 9*b* is a truth table for the OR gate of FIGURE 9*a*;

FIGURE 10*a* is a logic symbol for a NAND gate, and FIGURE 10*b* is a truth table for the NAND gate of FIGURE 10*a*;

FIGURE 11*a* is a logic symbol for a NOR gate, and FIGURE 11*b* is a truth table for the NOR gate of FIGURE 11*a*;

FIGURE 12*a* is a logic symbol for a NOT gate or logical inverter, and FIGURE 12*b* is a truth table for the NOT gate or logical inverter of FIGURE 12*b*;

FIGURE 13*a* is a logic symbol for a serial full adder, and FIGURE 13*b* is a characteristic table for the serial full adder of FIGURE 13*a*;

FIGURE 14 is a logic diagram of a logic network which performs an Exclusive OR function;

FIGURE 15 is a logic diagram of an alternative logic network which performs an Exclusive OR function;

FIGURE 16 is a block diagram of the timing logic area of the arithmetic and control unit of FIGURE 5;

FIGURE 17 is a table showing the relationship between three Flip-Flops comprising a Sequence Time Counter in the timing logic area, the signals which issue from the Sequence Time Counter, and the logic equations of signals which advance the Sequence Time Counter from one state to the next;

FIGURE 18 is a block diagram indicating the major information flow paths opened between various registers of the arithmetic and control unit of FIGURE 5 in a normal first sequence control state during the execution of a typical command;

FIGURE 19 is a block diagram indicating the major information flow paths opened between various registers of the arithmetic and control unit of FIGURE 5 in a normal second sequence control state during the execution of a typical command;

FIGURE 20 is a timing diagram illustrating the timing sequence of signals which effect the information movement indicated in FIGURES 18 and 19 and also illustrating the interrelationship of the timing signals generated in the timing logic area of FIGURE 16.

Figure 21:
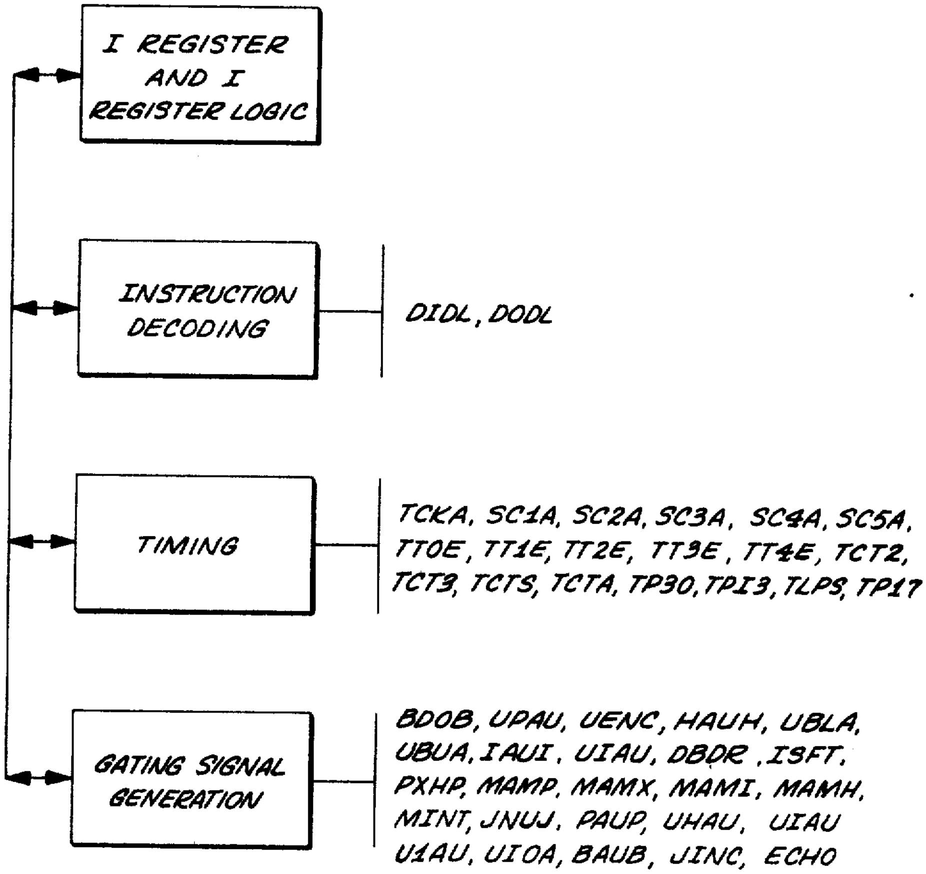

FIGURE 21 is a block diagram showing the major logic areas of the arithmetic and control unit of FIGURE 5 from which predetermined signals issue;

FIGURE 22*a* is a diagram representing a fixed length block of memory reserved for a circular list and also illustrating the format of a Device Code stored in the first memory location of the block and the format of a List Control Word stored in the second memory location of the block.

Figure 23:
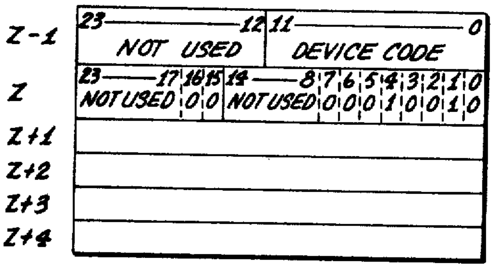
Figure 32:
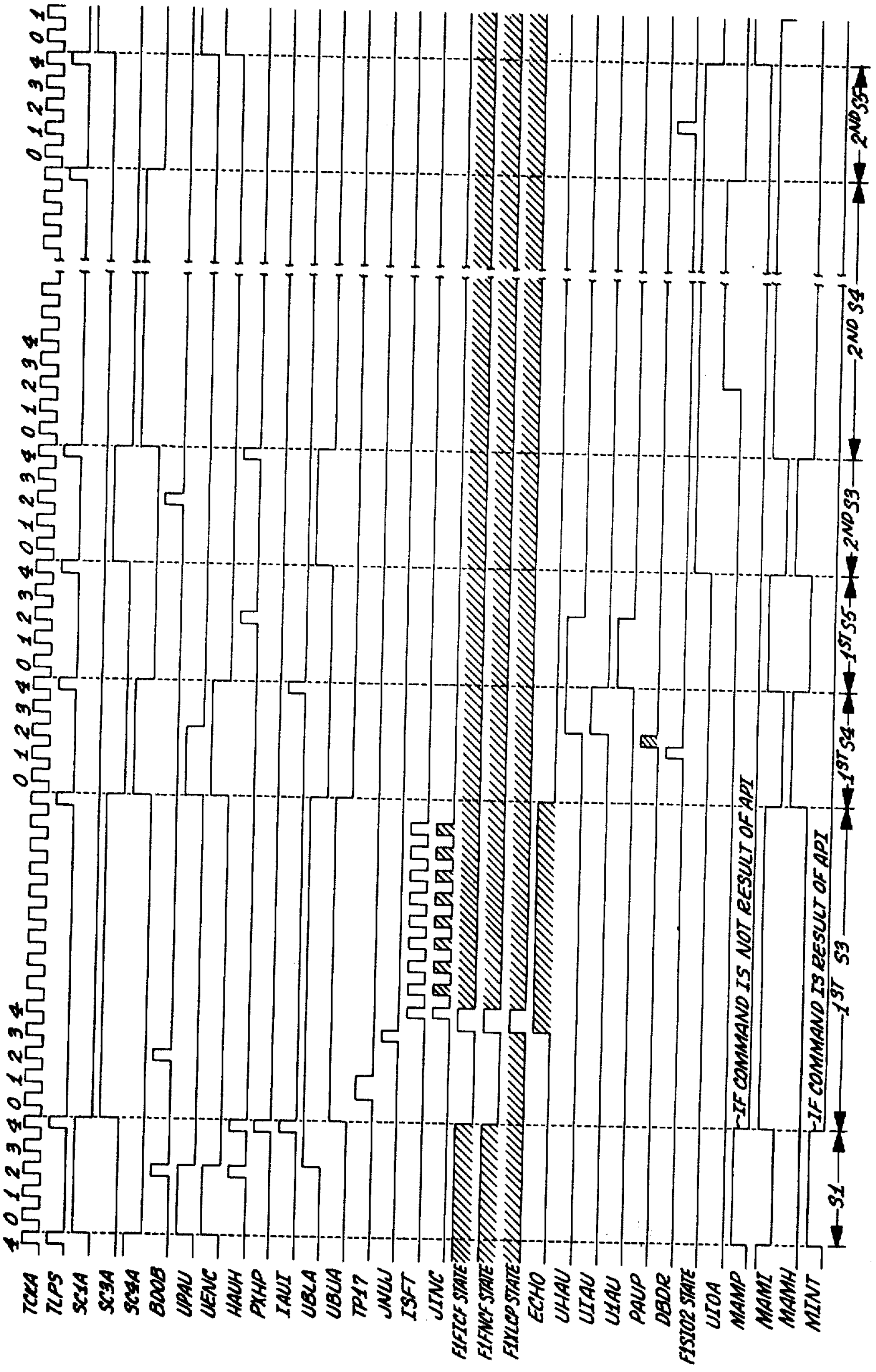
Figure 33:
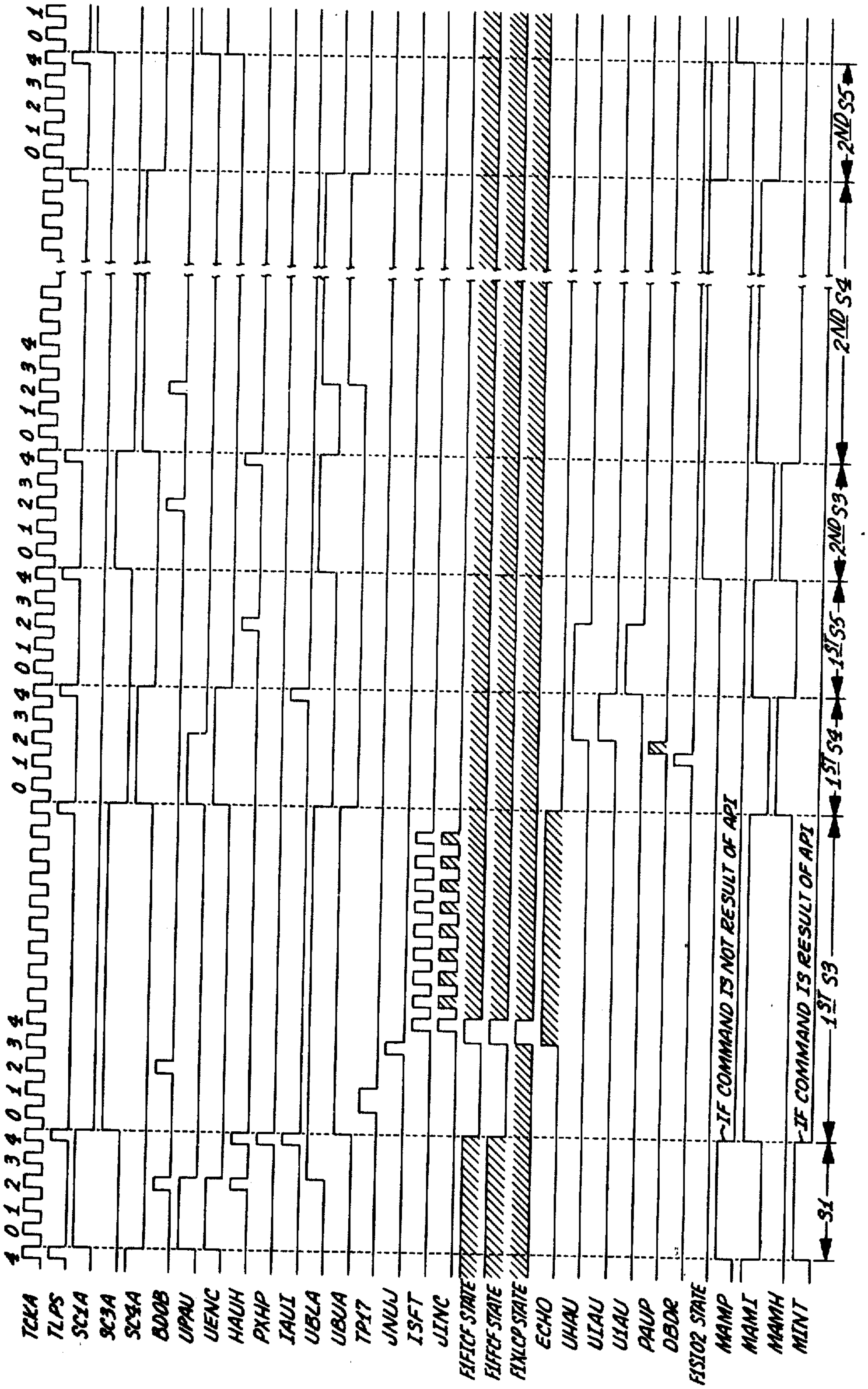
Figure 34:
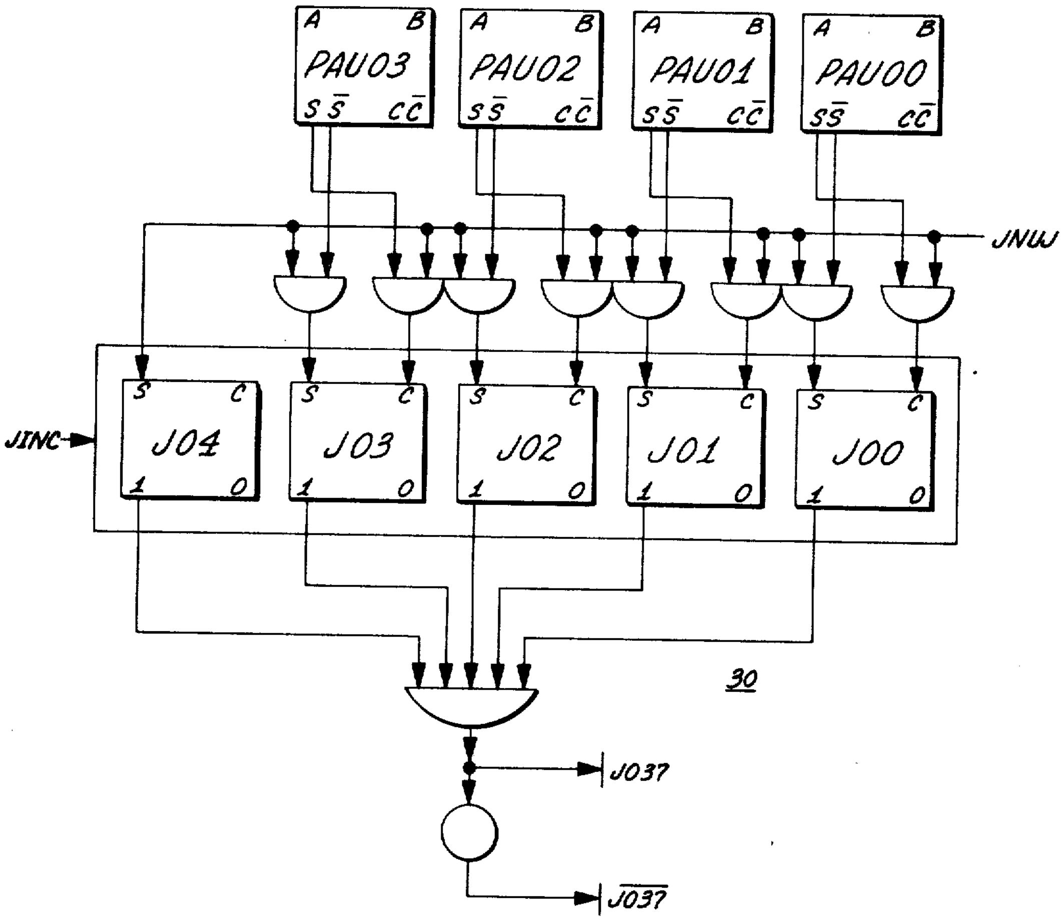
Figure 35:
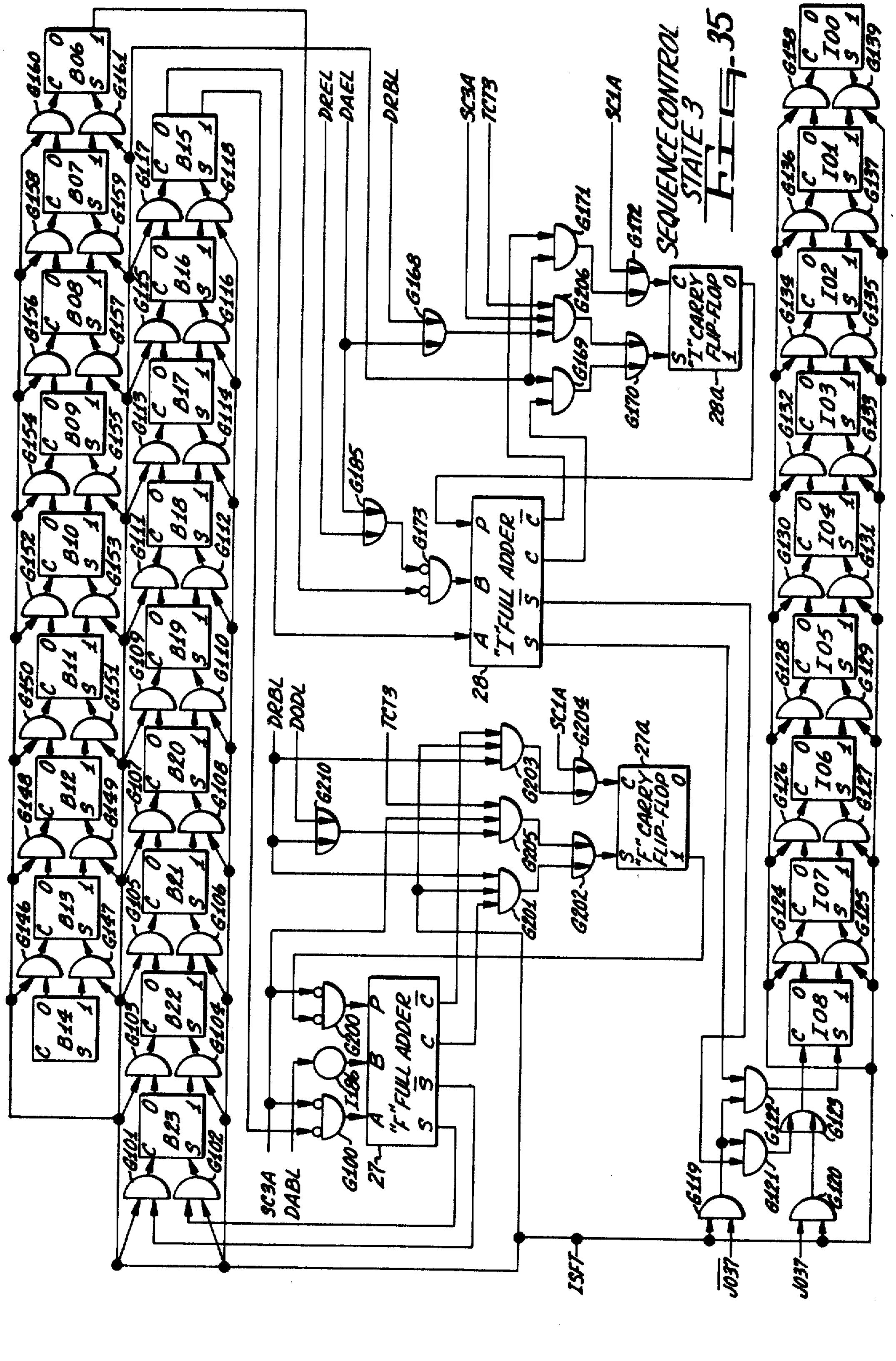
Figure 36:
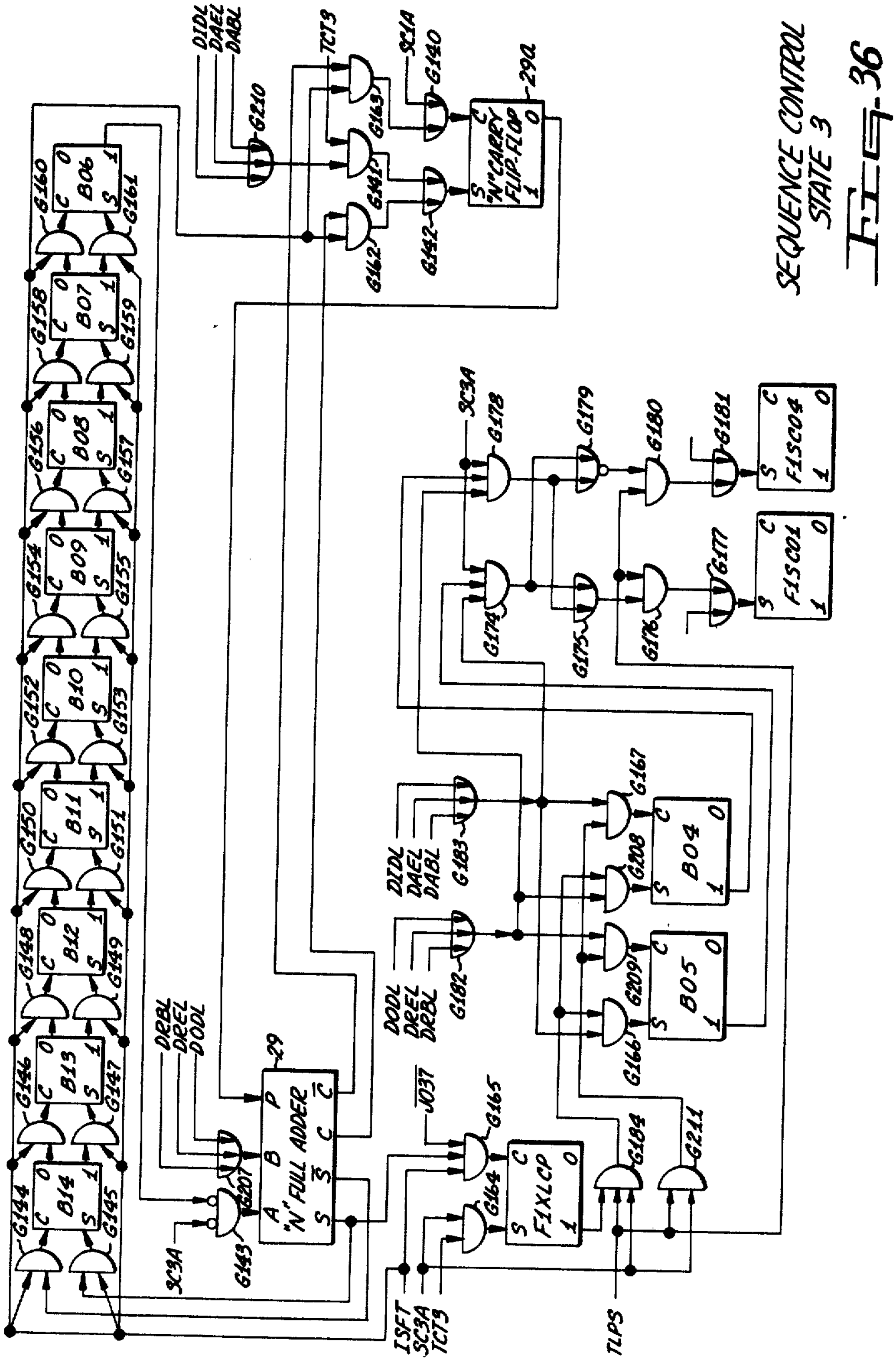
Figure 37:
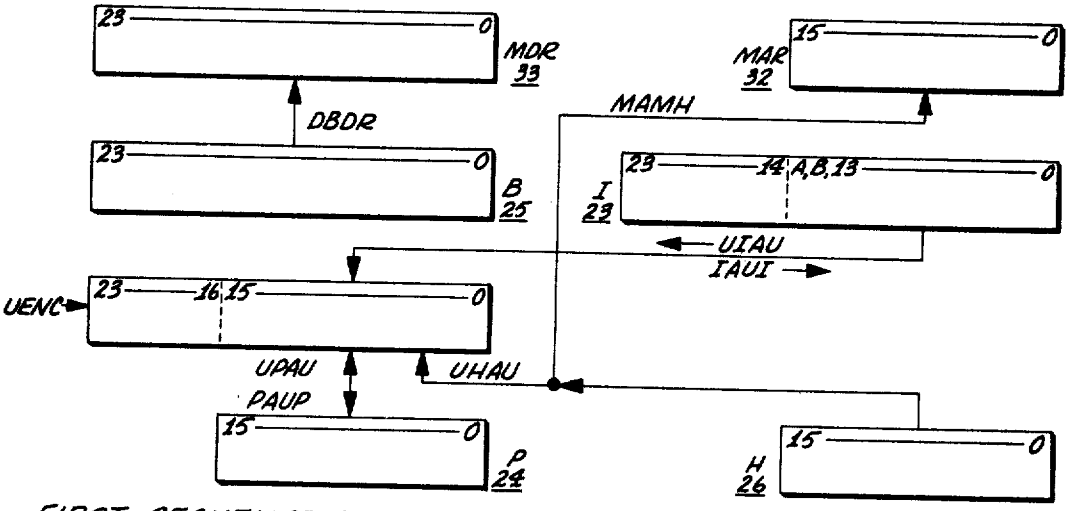
Figure 38:
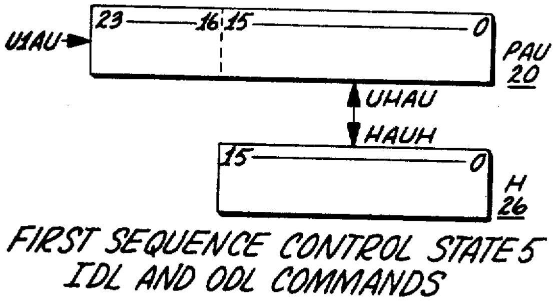
Figure 39:
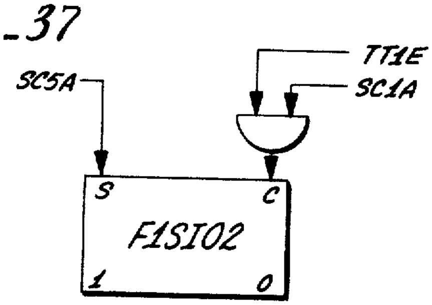
Figure 40:
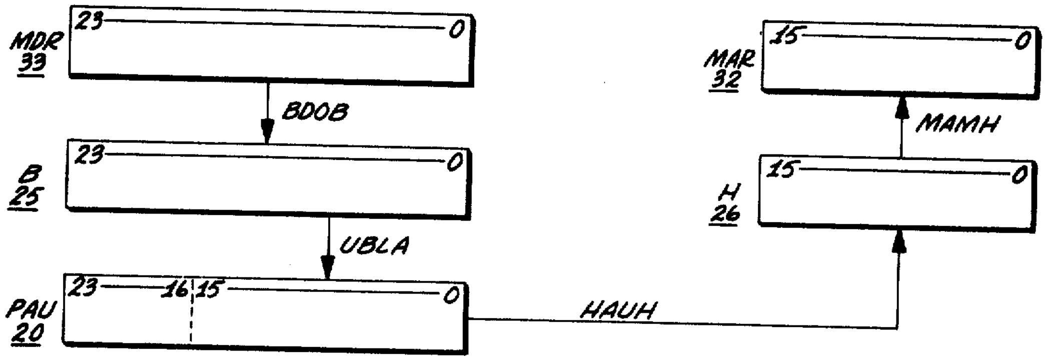
Figure 41:
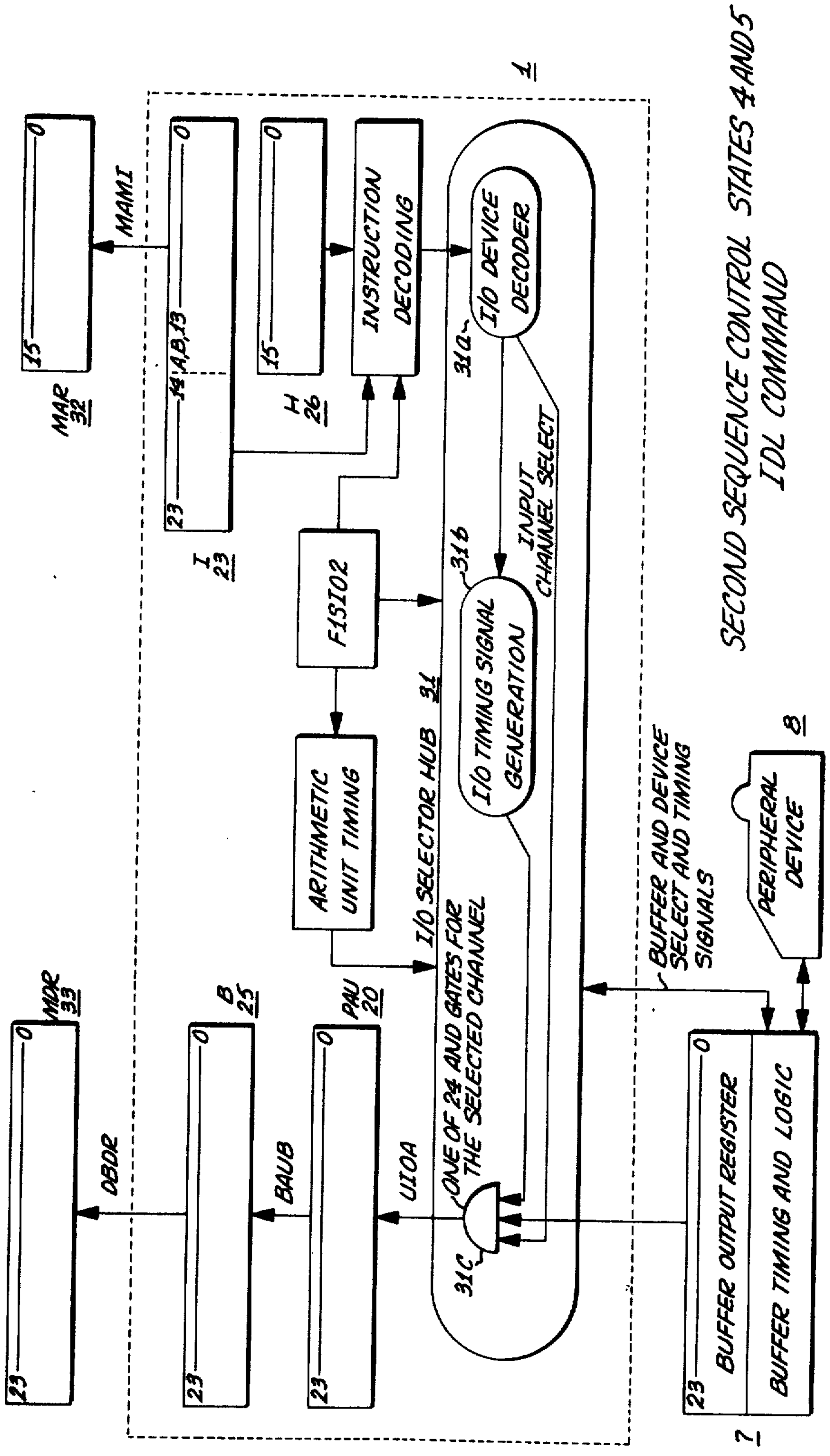
Figure 42:
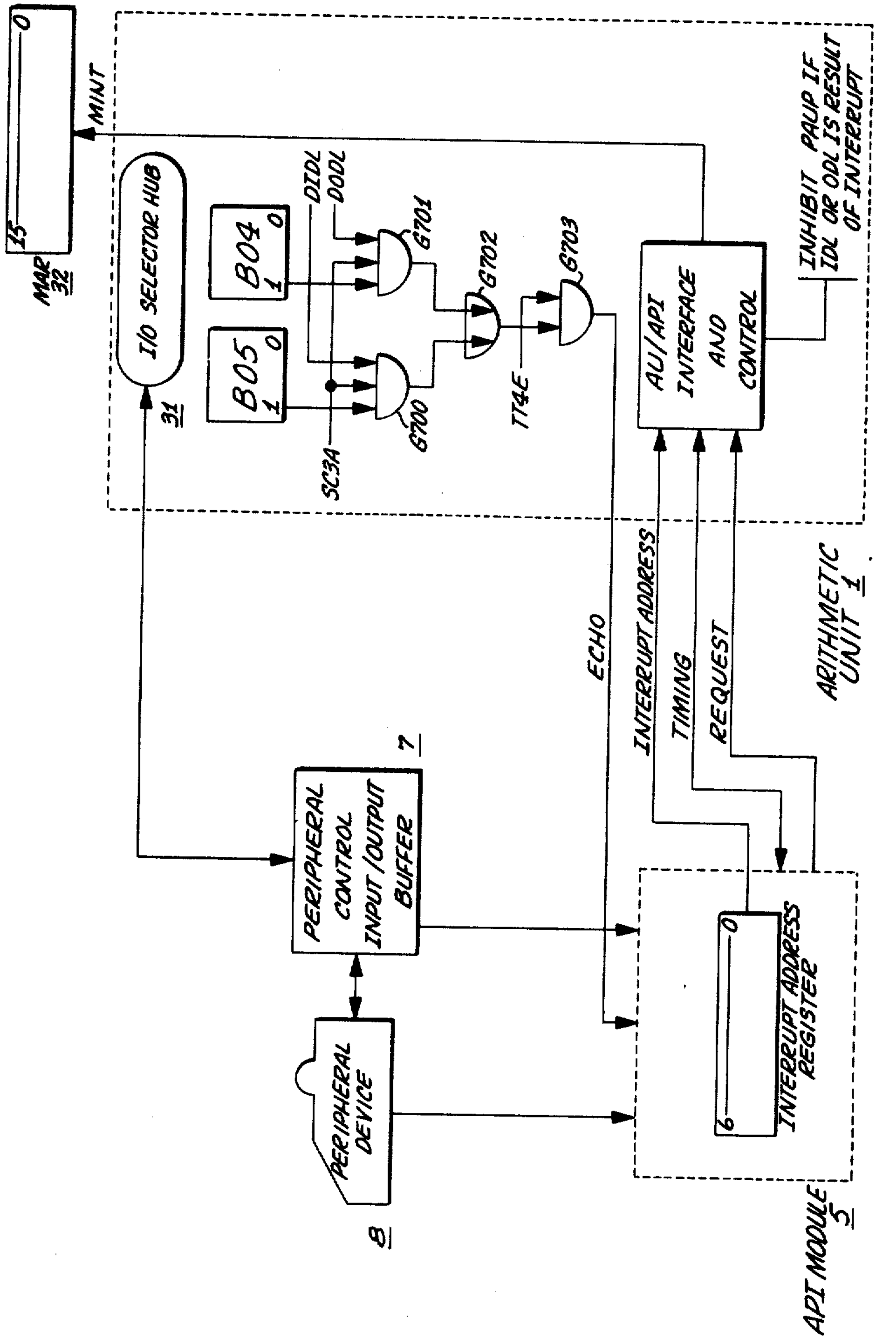
Figure 43:
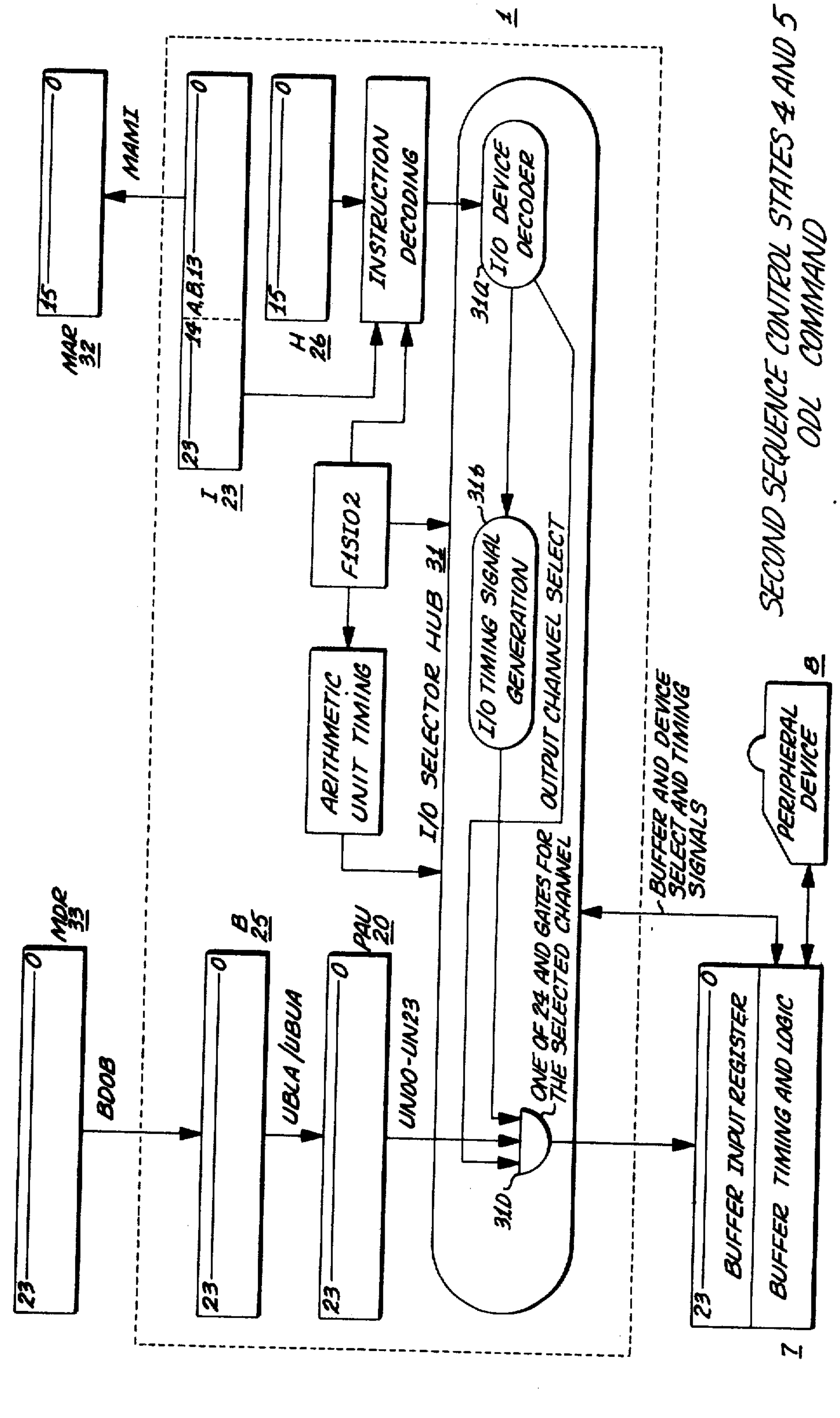

FIGURE 22*b* is a diagram symbolically illustrating the circular nature of the list of FIGURE 22*a*;

FIGURE 22*c* is a table showing the modifications which occur to "F" and "N" Fields of a List Control Word during execution of IDL and ODL Device commands and the memory storage location affected by each Device command relative to an address Z of the memory storage location in which a List Control Word is stored in terms of the "F" and "N" Fields before modification;

FIGURES 23–21 are diagrams representing the changing contents of an exemplary circular list as a series of IDL and ODL commands are performed by the apparatus of the instant invention;

FIGURE 32 is a timing diagram useful in explaining the operation of the apparatus of the invention in executing an IDL command;

FIGURE 33 is a timing diagram useful in explaining the operation of the apparatus of the invention in executing an ODL command;

FIGURE 34 is a block diagram illustrating the function of the J Counter in the arithmetic and control unit of FIGURE 5 during the execution of the IDL and ODL commands;

FIGURES 35 and 36 are logical schematic diagrams of the logic circuits providing critical bit manipulations, tests, and decisions occurring in a first pass through a third sequence control state during execution of the IDL and ODL commands;

FIGURE 37 is a block diagram showing information flow paths opened in the arithmetic and control unit of FIGURE 5 during a first pass through a fourth sequence control state during the execution of the IDL and ODL commands;

FIGURE 38 is a block diagram showing information flow paths opened in the arithmetic and control unit of FIGURE 5 during a first pass through a fifth sequence control state during the execution of the IDL and ODL commands;

FIGURE 39 is a logical schematic diagram of an Input/Output Flip-flop and the signals and logic utilized in setting and clearing the Input/Output Flip-flop;

FIGURE 40 is a block diagram showing information flow paths opened in the arithmetic and control unit of FIGURE 5 during a second pass through a third sequence control state during the execution of the IDL and ODL commands;

FIGURE 41 is a block diagram showing information flow paths opened in the arithmetic and control unit of FIGURE 5 and additional information flow paths established between the arithmetic and control unit and memory and the arithmetic and control unit and a peripheral input/output buffer during a second pass through fourth and fifth sequence control states during the execution of the IDL command;

FIGURE 42 is a block diagram showing the relationship established between the arithmetic and control unit of FIGURE 5 and the automatic priority interrupt module, a peripheral control input/output buffer and a peripheral device of FIGURE 1 when an IDL or ODL command is executed as the result of an automatic priority interrupt; and, FIGURE 43 is a block diagram showing information flow paths opened in the arithmetic and control unit of FIGURE 5 and additional information flow paths established between the arithmetic and control unit and memory and the arithmetic and control unit and a peripheral control input/output buffer during a second pass through fourth and fifth sequence control states during the execution of the ODL command.

PROCESS COMPUTER SYSTEM

A diagram showing the organization of a process computer system and its relationship to a controlled or monitored process is presented in FIGURE 1. An Arithmetic and Control Unit 1 performs calculations and other logical operations and also sequences and distributes information throughout the system. It supplies information to and receives information from a Main Memory module 2, an Automatic Priority Interrupt module 5, a Programming Console 6, a Peripheral Control Input/Output Buffer module 7, and a Process Signal Input/Output Buffer module 9.

The Main Memory module 2 typically and in this case contains a random access core storage characterized by its high speed capability. Appropriate control circuitry is provided to permit interchange of information with the Arithmetic and Control Unit 1, a Drum Memory 3, and such additional Bulk Storage Memory Devices 4 as may be required for a given system.

The Drum Memory 3 is a backup storage device for the Main Memory 2. It holds instruction routines and data which can be transferred into the Main Memory 2 upon demand. The Bulk Storage Memory Devices 4 are typically magnetic disk random access storage units and/or magnetic tape storage units used for massive storage of information to which the Arithmetic and Control Unit 1 need not have high speed access but which can be transferred into Main Memory 2 upon demand as may be required.

The Automatic Priority Interrupt module 5 detects and identifies "ready" signals from the Peripheral Devices 8 that require testing at relatively long time intervals. A "ready" signal from a peripheral device indicates that it is physically ready to perform its normal function. For example, if a typewriter is "ready" to type, its power is on, its motor is up to speed, and it will have completed any previous request to type a character, i.e., the physical operations which occur within the typewriter to type a character will have been completed so that another character can be typed if required. The Automatic Priority Interrupt module is also used to detect signals which indicate condition changes in the controlled or monitored process. When an interrupt signal is detected, the Arithmetic and Control Unit 1 is alerted, and a program subroutine is initiated at an appropriate time by a program branch to a memory address supplied by the Automatic Priority Interrupt module to service the requesting interrupt according to its relative importance.

The Process Signal Input/Output Buffer module 9 is a communications link between the Arithmetic and Control Unit 1 and the controlled and/or monitored process input and output devices. It acts as a multiplexer for digital and analog inputs and as a multiplexer and amplifier for output signals. Signal inputs may be from contact closures, pulse generators, or measuring devices. The Arithmetic and Control Unit 1 uses the logic and equations stored in Main Memory 2 to decide whether any control or alarm actions are required. If corrective or alarm action is needed, the Arithmetic and Control Unit 1 provides the necessary information through the Process Signal Input/Output Buffer 9 to the digital and/or analog output circuits to change the process control variables or activate the proper alarm devices or displays. A plurality of Process Signal Input/Output Buffer modules may be provided to communicate with a single Arithmetic and Control Unit where the requirements of a specific system exeed the capacity of a single Process Signal Input/Output Buffer module.

The Analog Input Scanner 10 selects and amplifies process analog sensor signals. It also converts analog information into a digital form compatible with that used within the Arithmetic and Control Unit 1 and the other system modules. The Digital Input Scanner module 11 selects and conditions (fiters, amplifies, attenuates) contact or digital process inputs. The Multiple Output Distributor module 12 selects and times digital, decimal, and analog outputs to the controlled and/or monitored process and to operator displays.

The Peripheral Control Input/Output Buffer module 7 communicates with the Arithmetic and Control Unit 1 and is used as a data buffer, translator, and sequencer for the various Peripheral Devices 8, which may include such Input/Output devices as typewriters, paper tape and card readers and punches, etc. A plurality of Peripheral Control Input/Output Buffer modules may be provided to communicate with a single Arithmetic and Control Unit where the requirements of a specific system exceed the capacity of a single Peripheral Control Input/Output Buffer.

The Programming Console 6 provides manual communications with the Arithmetic and Control Unit 1 in machine language for programming and maintenance. In addition, the Programming Console 6 is provided with light displays which show the instantaneous states of various registers and elements within the Arithmetic and Control Unit 1 as an aid to monitoring the system and program performance and condition.

INFORMATION REPRESENTATION

The process computer system of FIGURE 1 stores and processes information represented by the binary code in which each digit must be a "one" or a "zero." For a brief explanation of this now commonly used code, one may refer to Chapter 1 of Digital Computer Design Fundametals by Yaohan Chu, published, in 1962 by the McGraw-Hill Publishing Company, Inc. The fundamental unit of information employed in the particular system described is a word of 24 binary digits. The first binary digit or bit of a word is termed the most significant bit and is designated as bit 23. The last binary digit is termed the least significant bit of the word and is designated as bit 0. The binary digits between bits 23 and 0 are accorded successively decreasing orders of significance.

Three general categories of words are employed in the system; viz.: (1) data words, (2) command words, and (3) auxiliary words for addressing and control. For convenience a binary word may be more compactly represented by a series of "octal" digits in which each octal digit defines 3 adjacent binary digits. As illustrated in FIGURE 2, any decimal number between zero and seven may be represented by three binary digits so that there are eight total combinations possible, hence the designation "octal." FIGURE 3 illustrates a 24-bit word and the equivalent octal number which represents the binary word given as an example. As will be explained below, the operation codes of the various types of command words are defined by bits 23–18 of the command words. The operation codes may therefore be denoted by two octal digits. A subscript 8 placed after a number indicates octal notation. A subscript 10 placed after a number indicates decimal notation.

The Main Memory module 2 of FIGURE 1 may utilize storage elements of the coincident-current magnetic core type. A brief explanation of magnetic core storage can be found at pages 106, 107, and 108 of Digital Computer Primer by E. M. McCormick, published in 1959 by the McGraw-Hill Book Company, Inc. For this specification, it need only be observed that words stored in the Main Memory module 2 are individually identified by a binary number which represents the address of a specific core cell or storage location in a three-dimensional magnetic core matrix where a desired information word, command word, or control word is stored. If the appropriate binary identification number or address is supplied to the Main Memory module 2, the Memory circuitry can retrieve or "fetch" the designated 24-bit word from the magnetic core storage location and make it available to the Arithmetic and Control Unit 1. The extraction of a previously stored information word from a core memory may change the magnetic state of individual cores and so destroy the information stored therein. Normal practice in the art is to provide automatic apparatus which immediately restores the same binary word in the same Memory core cell or storage location from which it has been fetched so that, in effect, extracting information from a Memory storage location does not change the information stored there.

Memory storage location addresses are often specified in octal notation. For example, the Memory storage location address 01110110101110 is more compactly identified as $\mathbf{16656_8}$. It will be observed that, in this example, the binary number is 14 bits in length. For this reason, the most significant octal digit can never be higher than 3. If the binary number had been 13 bits in length, the most significant octal digit could never have been higher than 1. This follows from the conventional practice of dividing the binary word into octal digits by grouping from the least significant to the more significant bits.

The command or instruction words executed by the Arithmetic and Control Unit 1 are divided into six categories: Operand, GEN 1, GEN 2, GEN 3, Quasi, and Step Floating Point (SFP). The format of each of these command types is shown in FIGURE 4. As noted above, the operation codes for all commands are defined by the six most significant bits (23–18) of the command words. The operation code identifies the specific effect to be brought about by the performance of a command or instruction.

Full Operand commands, a sub-category of operand commands, are the most commonly used. These commands, which are processed as if the operand were contained by the entire word, are used to perform arithmetic operations, logical operations, index control operations, and data transfers to and from the Main Memory module 2. Bits 13–0 of these command words, the operand address portion, designate the address of the storage location in the Main Memory 2 containing information which is to be used or affected by executing the command. Bit 14 of the Full Operand command words, if a "one" brings about a modification to the operand address known as Relative Addressing which will be described below.

GEN 1 commands are differentiated from other command types by their unique operation code $05_8$. These commands are further sub-divided by the microcoding of bits 14–0 of the command word. GEN 1 commands are used primarily to effect bit manipulation within the principal accumulator register of the Arithmetic and Control Unit 1.

GEN 2 commands are differentiated from other commands by their unique operation code $25_8$. These commands are also sub-divided by the microcoding of bits 14–0 of the command word. GEN 2 commands are employed within the system to: (1) select modules and devices in the input/output equipment, (2) transfer data to or from these devices, and (3) provide for program control transfers as determined by various internal and external conditions to which the system is responsive.

GEN 3 commands are differentiated from other commands by their unique operation code $45_8$. These commands are also sub-divided by the microcoding of the bits 14–0 of the command word. GEN 3 commands are used to manipulate the contents of the principal and secondary accumulator registers and to effect other elements within the Arithmetic and Control Unit 1. GEN 3 commands are also used within Quasi subroutines for speeding up floating point arithmetic operations.

Quasi commands are identified by the presence of the number $7_8$ in bit positions 23 through 21 of the command word. These commands are utilized to initiate Quasi subroutines which perform floating point arithmetic operations or other recurring special functions. The Main Memory 2 address of the first command word in a Quasi subroutine is defined within the operation code of the appropriate Quasi command.

SFP (Step Floating Point) commands are identified by their unique operation code $01_8$. They are used within the Quasi subroutines to implement and speed up floating point arithmetic operations. Bits 14–0 of the command words are microcoded to bring about bit manipulations within the Arithmetic and Control Unit 1 of unique significance to the performance of floating point operations.

Bits 17–15 of all command words, denoted the X, or index, bits, are reserved for indicating whether conventional index modification is to be performed on a command before its execution and, if index modification is specified, which index cell contains the modifying or index quantity which is to be the modifier. If bits 17–15 of a command word are all "zeros," no index modification will occur when the command word is transferred to the Arithmetic and Control Unit 1 for execution. If bits 15–17 are any other possible combination (001–111), index modification of the command word will take place by causing the contents of the designated Memory storage location ($00001–00007_8$) to be added to bit positions 15–0 of the command word. With the most often used command type, Full Operand, the result is normally a change in the operand address portion of the command word. With other command types, however, the command microcoding, and hence the operation to be performed, can be affected by index modification.

Where the total possible number of words which may be stored in the Main Memory module 2 exceeds the definition capability of that part (bits 13–0) of the Full Operand command words which specifies the operand address, a unique form of addressing is utilized to achieve extended addressing capability without increasing the fundamental word length of the information processing system. Bit 14 of Full Operand command words is reserved for specifying whether or not Relative Addressing is to be used with a command word which has been called into the Arithmetic and Control Unit 1 for execution. If bit 14 is a "one," Relative Addressing is specified, and the operand address portion of the command word will be modified arithmetically according to certain defined rules before it is executed such that the total range of addressable storage locations in the Main Memory module 2 is four times as great as that which could be specified by bits 13–0 without the relative addressing capability. If bit 14 is "zero," Relative Addressing is not utilized, and the command word operand address is that specified directly by bits 13–0 subject to index modification as noted above.

Quasi command words can also be Relative Addressed although the result is not the same as that achieved with Full Operand command words. When a Quasi command word is executed and program control is transferred to the Memory storage location specified by the Quasi command word operation code portion, the binary number contained within the operand address portion is automatically transferred to a predetermined Memory storage location from which it can be extracted for use within the Quasi subroutine if necessary. When a Quasi command word is "Relative Addressed," the ultimate result is a change in the binary number placed into the predetermined Memory storage location rather than an actual change in an operand address per se.

ARITHMETIC AND CONTROL UNIT

FIGURE 5 is a simplified block diagram of the Arithmetic and Control Unit (henceforth, Arithmetic Unit) 1 and the registers within the Main Memory module 2 with which it is in direct communication. The block diagram indicates the functional relationship between the several registers, a Parallel Adder Unit, and three serial full adders. Transfer of information between registers and other elements of the Arithmetic Unit 1, as indicated by the interconnecting lines of FIGURE 5, is effected by parallel and/or serial transfer of binary digits from the source register or element to the receiving register or element. In the introductory description that follows, only the basic register characteristics and functions and the more usual information flow paths are discussed as a basis for more detailed and expanded discussion of the invention as the specification progresses.

The Parallel Adder Unit (henceforth PAU) 20 is a 24-bit parallel adder with simultaneous (look-ahead) carry propagation between each group of 4 bits which may be enabled or disabled as required. For a general discussion of parallel adder units with simultaneous carry propagation capability, one may refer to pages 390 and 391 of Digital Computer Design Fundamentals by Yaohan Chu and previously referred to in this specification. All parallel arithmetic operations within the Arithmetic Unit 1 are accomplished within the PAU 20. In addition to its arithmetic function, the PAU 20 serves as a "hub" for most parallel transfers of data between the other Arithmetic Unit 1 registers.

The A Register 21 is a 24-bit accumulator for arithmetic operations and bit manipulations. It is capable of either right or left serial shifting in addition to normal, parallel, information exchange with the PAU 20. Parallel transfer of information may be effected between a portion of the A Register 21 and the J Counter 30 for floating point operations. The A Register 21 is also capable of communicating with the Q Register 22, the "F" Full Adder 27, and the "N" Full Adder 29.

The Q Register 22 is a 24-bit auxiliary accumulator used in conjunction with the A Register 21 for double precision arithmetic operations. In addition, the contents of the Q Register 22 are used to define operative fields of the A Register 21 and/or B Register 25 during the performance of Field commands, another sub-category of operand instruction words, in which only the specified fields (groups of one or more bits) of an information word are affected. The Q Register is also capable of left or right shifting and of normal parallel transfer of information to or from the PAU 20 and is capable of communicating with the "F" Full Adder 27.

The I (Instruction) Register 23 is a 26-bit register which holds the command word being executed at a given time. Two bits, A and B, are interposed between bits 14 and 13 of a standard 24-bit command word when in the I Register 23 to provide a 16-bit operand field for extended memory addressing. Information transferred to or from the I Register 23 normally moves in parallel although portions of the I Register 23 may be serially shifted under certain conditions. The I Register 23 is capable of communicating with the PAU 20, the P Register 24, the "I" Full Adder 28, the Memory Address Register 32, and the Memory Data Register 33.

The P (Program Location) Register 24 is a 16-bit register which normally specifies the address of the storage location in the Main Memory module 2 from which the next command to be executed is to be extracted. All information is transferred to and from the P Register 24 in parallel. The P Register 24 is capable of communicating with the Parallel Adder Unit 20, the I Register 23, the H Register 26, and the Memory Address Register 32.

The B Register 25 is a 24-bit parallel-entry buffer register disposed between the Main Memory module 2 and the processing registers of the Arithmetic Unit 1. All information passing to or from the storage locations in the Main Memory module 2 is routed through this register via the Memory Data Register 33. The B Register 25 is capable of being right shifted during the performance of certain commands with which the B Register 25 is utilized as a functional information processor as well as a buffer. Information is transferred between the B Register 25 and the PAU 2 in parallel. The B Register 25 is also capable of communicating with the "F" Full Adder 27, the "I" Full Adder 28, and the "N" Full Adder.

The H (Holding) Register 26 is a 16-bit register used primarily to provide temporary information storage during the execution of certain "extended function" commands. This register is capable of accepting parallel data from the PAU 20 and transferring parallel data to the PAU 20, the P Register 24, and the Memory Address Register 32.

The "F" Full Adder 27 is used to implement arithmetic and logical manipulation on fields specified by the Q Register 22 during the performance Field commands and also to update a portion of List Control Words during the execution of List commands which affect certain storage locations in specified portions of the Main Memory 2.

The "I" Full Adder 28 is used to compute, from information contained within List Control Words, the relative location of items to be removed or appended to lists stored in the Main Memory module 2 during the performance of List commands.

The "N" Full Adder 29 is used to implement arithmetic and logic manipulations of the A Register 21 and to update second and third portions of List Control Words during the performance of List commands.

The J Counter 30 is a 5-bit counter used to control information manipulation and certain aspects of timing during the execution of a number of commands which require counting in one form or another, some according to variable conditions.

The Input/Output (henceforth, I/O) Selector Hub 31 provides Arithmetic Unit communications with the Peripheral Control Input/Output Buffer 7, the Process Signal Input/Output Buffer 9, and the Programming Console 6. The I/O Selector Hub enables one of a plurality of selectable 24-bit I/O information channels during the execution of certain commands. All parallel data transfers from Input/Output devices are routed through the I/O Selector Hub 31 to the PAU 20 for further distribution within the Arithmetic Unit 1.

The Memory Address Register 32 is 16-bit register which is an integral part of the Main Memory module 2 rather than the Arithmetic Unit 1. However, it receives a 16-bit truncated word directly from the P, I, or H Registers of the Arithmetic Unit 1, which word specifies the Memory storage address for the next stored 24-bit word which is to be transferred from Main Memory 2 into the Arthmetic Unit 1 via the Memory Data Register 33.

The Memory Data Register 33 is also an integral part of the Main Memory module 2. It is a 24-bit register which holds any word just extracted from a Memory storage location in response to a specific address having been placed in the Memory Address Register 32 and a Memory request having been made by the Arithmetic Unit 1. The Memory Data Register 33 communicates with the B Register 25 and I Register 23 of the Arithmetic Unit.

LOGIC AND LOGIC COMBINATIONS

In a fundamentally binary information processing system, any given signal representing a single bit of information must always be either true or false or, as it is more commonly expressed, either "one" or "zero." Ordinarily, these states are represented within an information processor, other than as stored in Memory devices, by two discrete voltage levels. For example, a voltage level of nominally five volts positive may correspond to a binary "one" signal, and a voltage level of nominally zero volts to a binary "zero." The choice of voltage levels is arbitrary except for the consideration of using specific types of logic circuitry which may be preferred or prescribed. It is not uncommon for the two discrete voltage levels which represent "one" and "zero" conditions to be different in different logic areas of an information processing system; that is to say, a system in which "ones" and "zeros" are normally represented by five volts positive and zero volts levels respectively may include areas in which conditions require a wider voltage disparity and, perhaps, a polarity inversion. These areas might have logic voltage levels, for example, of 18 volts negative for "ones" and six volts positive for "zeros." For these reasons, it is standard practice to explain binary logic systems in straightforward terms of "one" and "zero" conditions without excessive concern for the precise arbitrary voltages representing these conditions.

Temporary storage of a bit of information may be effected by deliberately setting a bistable device to one or the other of its stable states to represent a "one" or a "zero." The bistable device most widely used in electronic information processors is the well known "flip-flop." A flip-flop is said to be in either the "one" state or the "zero" state and has the capability of retaining a state into which it has been placed until it is operated upon and forced into its alternate state. A change of state of a flip-flop is normally brought about by applying a voltage pulse to a "set" or "clear" (sometimes called "reset") input. As a practical matter, a flip-flop is usually designed to respond to voltage transients so that a change of state occurs, according to design, on the trailing or leading edge of a voltage pulse applied to a flip-flop input.

The state of a flip-flop may be reflected in one or more outputs, and a flip-flop is usually provided with both "one" and "zero" outputs. Should a flip-flop be in the "one" or set state, the "one" output would be true and the "zero" output would be false. If positive five volts and zero volts represent "one" and "zero" signal levels within the local logic area of the system, the "one" output would be positive five volts and the "zero" output would be zero volts. On the other hand, if the flip-flop is in the "zero" or cleared state rather than set, the "one" output would be zero volts or false and the "zero" output would be positive five volts or true.

FIGURE 6A shows a logic symbol for a flip-flop with its input and output terminals indicated. FIGURE 6B is a voltage/time diagram which illustrates the response characteristics of a flip-flop to set and clear pulses applied to the appropriate input terminals.

Information requiring a plurality of bits for definition may be temporarily stored in a group of flip-flops which make up a register. Hence, a 24-bit word may be placed in a 24-bit register, and the state of each flip-flop in the register may be ascertained by observing the voltage levels at the individual "one" and "zero" outputs. The flip-flops of a register may be interconnected to permit serial shifting of the information bits in unison to the next higher order or next lower order bit position relative to each. A brief explanation of serial shifting may be found on pages 95 and 96 of Digital Computer Primer by E. M. McCormick and previously referred to in this specification. Entry of information into a register may be performed serially or in parallel to each individual flip-flop in unison. The flip-flops of a register may also be interconnected such that the register functions as a counter to accumulate intermittent pulses from one or more pulses.

Movement of information between the registers of an information processor and many other related functions are performed in relative synchronism. A common time base generator is therefore required; and this conveniently may be a stable oscillator and a suitable wave shaping circuit to produce a train of regular, rectangular pulses often designated the "Clock." The "one" and "zero" positions of a Clock pulse train may be time symmetrical or asymmetrical as may be appropriate for the system which it governs. FIGURE 7A is a block representation of a Clock Generator 35, and FIGURE 7B is a diagram showing the time and voltage dimensions of a 2.94 megacycle Clock signal suitable for use in an information processing system with which the present invention may be practiced.

Generally, two or more output signals from flip-flops and/or other bistable devices such as switches are combined logically, sometimes with and sometimes without a Clock or other timing signals, by "gates" to provide input signals to other flip-flops and to provide gating signals which are logically combined with binary information signals to control information movement within the system, both as to path and as to relative time.

A gate has a single output which reflects logically the instantaneous state of its inputs. These inputs may, for logical design purposes, be any number required. Gates with certain distinctive characteristics are conventionally designated AND gates, OR gates, NAND gates, NOR gates, and NOT gates. Gates are represented in logic diagrams by standard symbols according to their characteristics, which characteristics may be summarized in a truth table for each type of gate. For example, a logic notation symbol for a two-input AND gate and its truth table are shown in FIGURES 8A and 8B, respectively. It will be observed that only when inputs A and B are both "ones" will the output W be a "one." If one or more of the inputs should change to "zero," the output would switch to "zero."

FIGURE 9A shows a logic notation symbol for a two-input OR gate and FIGURE 9B its truth table. It will be observed that if one or the other or both the inputs F and G is "one" then the gate output will be "one." If the inputs are all "zeroes," the output X will be "zero."

Equivalent logic notation symbols and their corresponding truth tables for NAND and NOR gates are shown in FIGURES 10A, 10B and 11A, 11B respectively.

Another element widely used in binary logic networks is the logical inverter which has a single input and a single output and, as its name implies, converts a "one" input to a "zero" output and a "zero" input to a "one" output. A logic notation symbol and truth table for the logical inverter are shown in FIGURES 12A and 12B. The logical inverter is also known as the NOT gate.

A three-input, four-output logic element known in the art as a "full adder" is represented by the logic notation symbol shown in FIGURE 13A. The characteristics of a full adder are summarized in a table presented in FIGURE 13B. The S and $\overline{S}$ outputs are complementary "sum" signals, and the C and $\overline{C}$ outputs are complementary "carry" signals. Full adders are used, often in conjunction with "carry" flip-flops, to perform binary arithmetic. It may be observed that the full adder characterized in FIGURE 13B "adds" in response to "zero" inputs rather than "one" inputs. This is merely a matter of circuit preference, and full adders responding to "one" inputs are also well known in the art.

In order to achieve meaningful and orderly movements of information betwee nthe various registers and other elements of an information processor, after a need for specific movements and combinations of movements has been established, gating signals must be generated or issued which permit the prescribed movements of information at the desired time and inhibit any undesirable movements of information at the same time. The exact manner in which a specific signal may be generated according to precisely defined conditions within a computer system at certain precisely defined times has become a matter of common knowledge within the art. Generally speaking, a signal issues, usually as a gate output, when all requisite conditions are satisfied in its logic chain. The conditions in a chain are themselves represented by other signals which may be individually dependent upon a higher order logic chain relative to the specific signal of interest. Alternatively, it is manifest that these higher order logic chains can simply be considered elements of the total set of conditions upon which the issuance of the ultimate signal depends. The origin of a given signal can thus be traced back to a unique set of conditions each of which depends upon the state of a bistable device at a given instant of time and which may or may not be logically combined with timing signals such as a Clock.

A unique mnemonic designation is conventionally assigned to each unique signal within a binary information processing system. In the present system, signals are identified by four character mnemonic designations. The Clock, for example, is designated TCKA. Following standard logic rotation practice, a signal designated $\overline{TCKA}$ is the logical inversion of TCKA as indicated by the bar over the mnemonic. Whenever TCKA is "one," $\overline{TCKA}$ must be "zero"; and whenever TCKA is "zero," $\overline{TCKA}$ must be "one."

The set of conditions which must be fulfilled for a given signal to be "one" may be expressed by the classical logic or Boolean equation. The use of Boolean algebra to represent binary logic combinations has become so universally known and practiced in the art that it need not be discussed at length here. An elementary treatment, adequate for an understanding of this specification, may be found in Appendix A of Digital Computer Primer by E. M. McCormick, previously referred to in this specification. For a more extended discussion of Boolean algebra and its use in logical design, one may see chapters 3 and 4 of Digital Computer Design Fundamentals by Yaohan Chu and previously referred to in this specification.

It is of some importance to understand that what is commonly and conventionally designated a "signal" in a binary information processor is often conceptually both a signal and an electrical point where the signal is represented as a function of time by one of two discrete voltage levels. For this reason, a logic equation wherein a given signal is expressed in terms of other signals also defines the orientation and interconnection of logic elements, such as gates and inverters, by which the signal is generated. As an example, assume that a combination of logic elements is to produce a "one" output signal when either one, but not both, of two input signals A and B is "one." Further, assume a restriction to the use of AND gates, OR gates, and NOT gates to achieve the desired result.

A logic element combination that meets these requirements and restrictions is presented in FIGURE 14. If a "one" signal is present at either A or B, but not both, a "one" output will be realized at X, the output from AND gate 42. The AND gate 40 is not enabled since one or the other of its two enabling requirements has not been met, and, as a consequence, its output C is "zero." The NOT gate 41 converts this "zero" signal to a "one" signal at point D to enable one input of the AND gate 42. The OR gate 43 is enabled since it will respond to a "one" signal at either A or B to produce a "one" signal at E which enables the remaining input of the AND gate 42. If "one" signals are present at both A and B, a "zero" signal will appear at point X. The AND gate 40 will produce a "one" output at C since both its input signals are "one"; the NOT gate 41 will therefore produce a "zero" output at point D to disable one input of the AND gate 42. If "zero" signals are present at both A and B, a "zero" output will appear at point X. The OR gate 43 will be disabled since neither of its inputs is "one." The OR gate 43 will therefore produce a "zero" output at point E to disable one input of the AND gate 42.

The logic combination shown in FIGURE 14 is sometimes referred to as an EXCLUSIVE OR gate because of its one-or-the-other-but-not-both characteristic. The logical relationship of the signals employed in FIGURE 14 are defined by the equation $C=A\overline{B}+\overline{A}B$ which is read, according to conventional Boolean notation discussed in the above-cited references, as: C must be "one" when A but not B is "one" or when B but not A is "one."

If NAND gates are used, the logic element combination of FIGURE 15 will function is the same logical manner as that shown in FIGURE 14. The NAND gate 44 of the FIGURE 15 combination performs the functions of both the AND gate 40 and the NOT gate 41 of the FIGURE 14 combination.

The means by which a skilled logical designer, who is aware of which logic elements are available and of their characteristics, can determine the exact logic elements and exact interconnection required for a logic chain ending in a signal which has been defined by a logic equation is explained at length in many standard texts. One may refer to chapter 3 and, particularly chapter 4 of Digital Computer Design Fundamentals by Yaohan Chu and previously referred to in this specification. It is readily apparent from the above that the creation of a unique control signal defined in terms of other control and timing signals is well known in the art and no further explanation will be given here. In describing the invention, the more important control signals are defined in terms of their characteristics, and their origin is shown in blocks designated Instruction Decoding, Gating Signal Generation, and Timing.

TIMING AND NORMAL SEQUENCE CONTROL STATES 1 AND 2

To maintain an orderly and efficient succession of operations within the Arithmetic Unit 1, Sequence Control logic 50 provides five mutually exclusive Sequence Control States whic hare defined by five Sequence Control Flip-flops designated F1SC01, F1SC02 F1SC03, F1SC04, and F1SC05 as shown in the Timing Block Diagram of FIGURE 16.

The Sequence Control State 1 Flip-flop F1SC01 defines the "fetch" cycle for all commands. The fetch cycle is that period during which a command stored in Main Memory 2 is requested, is transfered from Main Memory 2 to the Arithmetic Unit 1, and is routed into the I Register 23. In addition, the count in the P Register 24 is usually incremented during Sequence Control State 1, and other information movement among the registers may occur. A few commands which can be completed by a simple group of operations are completely executed during Sequence Control State 1. Relative Addressing, when specified by bit 14 of the command word, also occurs during Sequence Control State 1. Timing signal SC1A is "one" when the Sequence Control State 1 Flip-flop F1SC01 is set.

The Sequence Control State 2 Flip-flop F1SC02 defines the sequencing cycle when index modification occurs. In addition, Sequence Control State 2 is entered during the performance of several commands that utilize the X bits (17–15) of a command word for purposes other than normal index modification. Sequence Control State 2, when required, is normally entered immediately following Sequence Control State 1. Timing Signal SC2A is "one" when the Sequence Control State 2 Flip-flop F1SC02 is set.

The Sequence Control State 3 Flip-flop F1SC03 is used to provide additional bit manipulation time for a number of commands under certain conditions prior to further execution. The time extent of Sequence Control State 3 is determined by the requirements of the individual commands. Timing signal SC3A is "one" when the Sequence Control State 3 Flip-flop F1SC03 is set.

The Sequence Control State 4 Flip-flop F1SC04 defines the final execution state for most commands. Sequence Control State 4 is entered following Sequence Control States 1, 2, or 3 depending on the nature of the command being executed. Like Sequence Control State 3, Sequence Control State 4 may be time-extended as required for individual commands. Timing signal SC4A is "one" when the Sequence Control State 4 Flip-flop F1SC04 is set.

The Sequence Control State 5 Flip-flop F1SC05 defines a time period necessary for performing additional functions required to complete the execution of a few commands. Timing signal SC5A is "one" when the Sequence Control State 5 Flip-flop F1SC05 is set.

The timing control signals required for optimum operation within each Sequence Control State and for insuring timely changes from one Delay Control State to another are generated by a Sequence Time Counter 51 and a Sequence Time Counter 52 in conjunction with the Clock signal TCKA provided by the Clock Generator 35. In FIGURE 20 and subsequent timing diagrams, the Clock signal TCKA is drawn symmetrically for convenience rather than asymmetrically as in FIGURE 7B. The Sequence Time Counter 52 comprises three flip-flops: F1TCSA, F1TCSB, and F1TCSC. The timing signals decoded from the Sequence Time Counter 51 are tabulated immediately associated with the Sequence Time Counter in FIGURE 17 along with the logic equations for the counter advancing pulses which are developed in the logic immediately associated with the Sequence Time Counter 52.

The Delay Time Counter 51 comprises five Flip-flops: F1TAFF, F1TBFF, F1TCFF, F1TDFF, and F1TEFF. It is used to provide special control signals during the execution of commands requiring extension of the normal durations of Sequence Control States 3 and/or 4. The Delay Time Counter 51 is preset during Sequence Control States 3 and/or 4 of these commands to a count less than $30_8$ and is then incremented by the Clock signal TCKA. During all other Sequence Control States, the Delay Time Counter 51 is preset to $30_8$ and is inhibited from being incremented. A Delay Time Counter Complete signal TP13 becomes "one" when the Delay Time Counter 51 count reaches $30_8$ and the Sequence Time Counter 52 is in the TT4E state. When this condition is attained, a Last Pulse signal TLPS is generated coincident with TCKA. The trailing edge of signal TLPS during any Sequence Control State clears the Sequence Time Counter 52, and the timing cycle for the next Sequence Control State is entered. At the trailing edge of signal TLPS of the final Sequence Control State for the execution of any command, Sequence Control State 1 is re-entered to initiate execution of the succeeding command.

The primary function of Sequence Control State 1 is to bring a command stored in Memory at an address specified by the contents of P Register 24 into the Arithmetic Unit 1 so that it may be decoded and executed. In addition, the P Register 24 is normally incremented during Sequence Control State 1 so that it will contain the address of the next command to be executed if the normal program sequence is followed. It may be noted here that certain conditions or commands can dictate a deviation from the straight instruction sequence provided by the P Register 24.

The primary purpose of Sequence Control State 2 is to implement conventional index modification when bits 15, 16, and 17 of a command word being executed are not all "zeros." This condition will have been detected during TCTA time of Sequence Control State 1 and appropriate signals generated so that Sequence Control State 2 is entered at the end of Sequence Control State 1.

The signals generated and the information flow scheme which takes place during Sequence Control States 1 and 2 is identical or nearly so for all commands. FIGURES 18 and 19 are block diagrams which indicate the information flow paths established during normal Sequence Control States 1 and 2, respectively; and FIGURE 20 is a timing diagram of the important gating signals which permit the proper paths to be established. In addition, the normal timing signals utilized within every Sequence Control States are included in the timing diagram of FIGURE 20.

The operation and function of normal Sequence Control States 1 and 2 may best be understood by considering the following description in conjunction with FIGURES 1, 5, 18, 19, 20, and 21. FIGURE 21 is a block diagram showing the logic areas of the Arithmetic Unit 1 from which the more important signals issue.

It should be noted that the Main Memory module 2 operates asynchronously with the Arithmetic Unit 1. To fetch a stored command word, Sequence Control State 1 is entered, and the Main Memory module 2 is alerted that a request is being made by the MREQ signal as shown in the timing diagram FIGURE 20. Simultaneously, the contents of the P Register 24 are gated to the Memory Address Register (MAR) 32 by the MAMP signal. The contents of the specified storage location in the Main Memory module 2 are fetched and placed into the Memory Data Register (MDR) 33 by the Main Memory module 2 logic functioning independently from the Arithmetic Unit 1. When the requested word is available from the Memory Data Register 33, the Main Memory module 2 generates a Data Ready signal CDRA to the Arithmetic Unit 1; and, during TCT2 time, the contents of the Memory Data Register 33 are gated to the B Register 25 by the BDOB signal. Additionally, Memory Data Register 33 bits 23–14 are gated to the I Register 23 bit positions 23–14 by the IDOC signal so that operation code decoding may commence. During TCTA time, B Register bits 13–0 are gated to bit positions 13–0 of the PAU 20 by the UBLA signal. At the trailing edge of signal TLPS during Sequence Control State 1, bits 15–0 of the PAU 20 are gated to bit positions A, B, 13–0 of the I Register 23 by the IAUI signal and to the H Register 26 by the HAUH signal.

Normal incrementation of the P Register 24 also occurs during Sequence Control State 1 and is brought about in the following manner without disturbing the information flow between the various Arithmetic Unit 1 elements. During TCTS time, the contents of the P Register 24 and a count of one are simultaneously gated to the PAU 20 by the UPAU and UENC signals, respectively. The output signals from the PAU 20 at this time represents the desired sum, $P+1$. This sum is gated to the H Register 26 by the HAUH signal which occurs during TCT2 time. At the trailing edge of signal TLPS, the contents of the H Register 26 are gated to the P Register 24 by the signal PXHP as the output signals from the PAU 20 bit positions 15–0 are gated to the H Register by the HAUH signal.

Thus, at the end of a normal Sequence Control State 1, the I Register 23 contains the command which has been requested from Main Memory module 2, the P Register 24 count has been incremented by one, the operand address portion of the fetched command word is in the H Register 26 and the next required Sequence Control State may be entered to continue the execution of the command. It will be observed that the operation code portion of the command word is in the I Register 23 during TCTA time of Sequence Control State 1, and appropriate control signals generated from instruction decoding become available at that time to influence: (a) the remainder of Sequence Control State 1 (as required for a very few commands), (b) the Sequence Control State which will be entered next following signal TLPS, and (c) the action to be taken during the succeeding Sequence Control States.

Assuming that bits 17–15 of the command word of the instruction being executed are not all "zeros," Sequence Control State 2 will be entered following Sequence Control State 1. The signal MREQ again becomes "one" to indicate a request to the Main Memory module 2. Simultaneously, the contents of the I Register 23 bit positions 17–15 are gated to the Memory Address Register 32 bit positions 2–0 by the MAMX signal to specify the memory storage location indexing quantity is to be fetched. This is conveniently one of the low order memory storage locations 00001 to $00007_8$; therefore, the higher order bit positions of the Memory Address Register 32 are simply cleared by the MAMX signal. When the CDRA signal indicates that the requested modifying data is available from the Memory Data Register 33, its contents are gated to the B Register 25 by the BDOB signal during TCT2 time. During TCTA time, the contents tof the B Register 25 are gated to the PAU 20 by the UBLA and UBUA signals. Simultaneously, the contents of the I Register 23 bit positions A, B, 13–0 are also gated to the PAU 20 by the UIAU signal. The output signals from the PAU 20 then represent the sum of the operand address portion of the command word present in the I Register 23 and the modifying word or index quantity stored in the specified index core cell. At the trailing edge of signal TLPS, the sum is gated from the PAU 20 bit positions 15–0 to the I Register 23 bit positions A, B, 13–0 by the IAUI signal, and the sequence control timing enters the next appropriate Sequence Control State according to the requirements of the individual command temporarily stored in the I Register 23. A few commands which affect or test the index cells use the index bits for instruction control and do not change the operand address portion of the command word.

In the following detailed description of the present invention, the assumption is made that the exemplary commands are not indexed in order that the timing charts do not become unnecessarily complex. It is to be understood, of course, that these commands can be index-modified in the manner just described.

DEVICE/LIST COMMUNICATIONS

FIGURES 22*a* and 22*b* are diagrams representing a fixed length block of Memory storage locations. The second word of the block is reserved for a List Control Word represented as stored in Memory storage location Z where Z is an arbitrary address for this example. The address Z serves as the label for an entire circular list associated with this block of Memory storage locations. The first word of the block is reserved for a Device Code Word represented as stored in Memory storage location $Z-1$. The actual length of the Device Code, a function of the system requirements, is 12 bits for this example.

The List Control Word contains several fields whose functions and characteristics will be discussed in general immediately below and in additional detail in conjunction with the explanations of two Device commands which can be executed to establish communications between a selected one of a plurality of external peripheral devices and a circular list. The format of the List Control Word is illustrated in FIGURE 22*b*. The maximum length, i.e., the size of the reserved Memory block, of any given list is defined in an L Field (bits 3–0) of the List Control Word for that list. List length is expressed as $2^L$ where L is the number contained within the List Control Word bits 3–0. In the present embodiment of the invention, L must be within the range $1 \leqq L \leqq 9$. Bit 4 of the List Control Word is a "List Empty" Field and is "one" only if the list is currently empty, i.e., no meaningful words or items are stored in the Memory storage locations of the List Control Word's list. Bit 5 of the List Control Word is a "List Full" Field and is a "one" only if the list is currently full as determined by the maximum list length defined by the L Field. The N Field (bits 14–6) of the List Control Word signifies directly the number of meaningful items currently in the list. The F Field (bits 23–15) of the List Control Word specifies the address of the Memory storage location available for a Beginning Item of the list expressed relative to Memory storage location $Z+1$. F must fall within the range $0 \leqq F \leqq 2^L-1$.

By addressing Memory storage location Z from the operand address portion of either of the two Device commands to be described in detail below, a selected Memory storage location can be affected within the block of Memory storage locations defined in the L Field of the List Control Word stored in Memory storage location Z. The specific Memory storage locations which serve as these "items" are dynamically rather than statically located; i.e., as information items are appended to or removed from a circular list, the beginning and ending of the occupied and vacant portions of the list changes accordingly but is always specified by the List Control Word to the extent necessary for the execution of the Device commands.

The circular list of FIGURES 22*a* and 22*b* is illustrated as partly occupied and partly vacant to show the normal relationship of the various items to one another and to the whole of the block of Memory storage locations reserved for the list. The Memory storage address of the Beginning Item is always $Z+1+(F+1)$ where F is the number contained within the F Field of the List Control Word and Z, as noted above, is the actual Memory address of the List Control word. Similarly, the address of the ending item is $Z+1+(F+N+1)$, N being the number of items currently stored within the list as specified by the N Field of the List Control Word.

As shown in FIGURE 22*a*, a Device Code which fully identifies a specific peripheral input or output device with which a circular list is to be placed in communication is stored in Memory storage location $Z-1$.

The following two independent Full Operand Device commands are decoded to provide the signals necessary to read items into a circular list from a peripheral device or to remove items from a circular list to a peripheral device and to appropriately modify the addressed List Control Word to reflect the changes to the list. An Input From Device To List command is arbitrarily assigned the mnemonic designation IDL and the operation code $67_8$. In response to the IDL command, the addressed List Control Word is transferred from the Main Memory module 2 to the Arithmetic Unit 1. If bit 5 of an addressed List Control Word is a "zero" (list not full), an information word passes from a peripheral device specified by the Device Code Word stored in Memory storage location $Z-1$ through the I/O Selector Hub 31 via a peripheral buffer and is stored as the new Ending Item of the list. The N field of the List Control Word is incremented by a count of one to reflect the new current number of items in the list. The address of the Beginning Item remains the same; thus, the F Field of the List Control Word is not modified. If the list becomes full with this operation, bit 5 of the List Control Word is set to a "one." The modified List Control Word is then restored to its appropriate storage location in Main Memory 2, and program control is transferred to the second sequential location from that specified by the P Register 24 before the IDL command was executed provided the IDL command was not the result of an Automatic Priority Interrupt. If the IDL command were the result of an Automatic Priority Interrupt, program control is transferred to the first sequential location from that specified by the P Register 24 before the IDL Interrupt was serviced. However, if bit 5 of the List Control Word is a "one" (list full) when the List Control Word is called into the Arithmetic Unit, the IDL command is not executed, an ECHO signal is generated to the Automatic Priority Interrupt module 5 to indicate this condition, neither the modified List Control Word nor the information word from the specified peripheral device are stored, and program control is transferred to the first sequential location from that specified by the P Register 24 when the attempt was made to service the Automatic Priority Interrupt.

An Output From List To Devise command is arbitrarily assigned the menmonic designation ODL and the operation code $66_8$. In response to the ODL command, the addressed Lost Control Word is transferred from the Main Memory module 2 to the Arithmetic Unit 1. If bit 4 of an addressed List Control Word is a "zero" (list not empty), the Beginning Item of the list is fetched from Main Memory 2, passed through the I/O Selector Hub 31 and a peripheral device specified by the Device Code stored in Memory storage location $Z—1$. The N Field of the List Control Word is decremented by a count of one to reflect the new current number of items in the list, and the F Field is incremented by a count of one to specify the new address of the Beginning Item of the list. Bit 4 of the List Control Word is set to "one" if the list is emptied by the execution of this instruction. The modified List Control Word is restored in Main Memory 2, and program control is transferred to the second sequential location from that specified by the P Register 24 before the ODL command was executed provided the ODL command was not the result of an Automatic Priority Interrupt. If the ODL command were the result of an Automatic Priority Interrupt, program control is transferred to the first sequential Memory storage location from that specified by the P Register 24 before the ODL Interrupt was serviced. However, if bit 4 is a "one" (list empty) when the List Control Word is called into the Arithmetic Unit 1, the ODL command is not executed, an ECHO signal is generated to the Automatic Priority Interrupt module 5 to indicate this condition, the modified List Control Word is not stored nor is the Beginning Item information word transferred from the list to the specified external device, and program control is transferred to the first sequential memory location from that specified by the P Register 24 when the attempt was made to service the ODL Automatic Priority Interrupt.

A table summarizing the modifications to the F and N Fields of List Control Words upon the successful execution of the IDL and ODL commands and the Memory storage location affected by each, relative to the address Z of the List Control Word, is presented in FIGURE 22*c*.

It is noted that upon successful execution of either of the Device commands, program control is transferred to the first or second sequential Memory storage location from that previously specified by the P Register 24 according to whether or not the instant Device command is the result of an Automatic Priority Interrupt. If the list condition, full or empty, is such that additional words cannot be transferred to or from, as the case may be, a peripheral device, program control is transferred to the first sequential location from that specified by the P Register 24 at the time the attempt was made to service the interrupt. A programmer, cognizant of these characteristics, may therefore insert appropriate command words into both the first and second sequential locations to direct a running program according to the successful or unsuccessful appendage or removal resulting from the execution of the Device command and may also utilize the Automatic Priority Interrupt alerted by the ECHO signal to further direct the program.

To aid an understanding of the exact Memory storage location affected by each of the Device commands, to clarify the terms Beginning Item and Ending Item, and to illustrate the circular nature of a circular list, example operations on a short list are provided with reference to FIGURES 22*c* and 23 through 31. It will be appreciated, of course, that, in a running program, these commands may be executed in a pseudo-random order with the many other commands of the program. For simplicity however, the Device commands are considered one after the other. The order of their execution is wholly arbitrary since each command is fully independent.

Consider that prior to a first step, the example list format as illustrated in FIGURE 23. If the list is empty, as indicated by bit 4 of the List Control Word stored in Memory storage location Z, the maximum number of items may be contained in the list as specified by the L Field is 4 ($2^2$), and the Memory storage address for a Beginning Item is $$Z+1+(F+1)=Z+1+(O+1)=Z+2$$

the F Field count being zero. Because of a maximum length of four items of the list in this example, only bits 15 and 16 of the F Field and only bits 6 and 7 of the N Field are utilized in the computation of item addresses.

Figure 24:
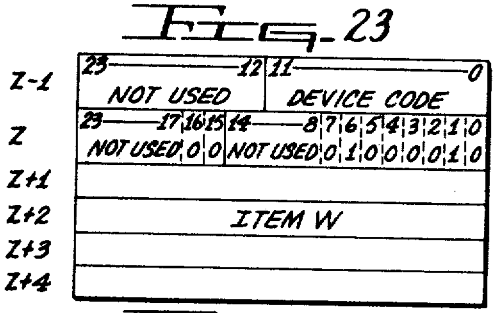

Assume a first step in which an IDL command having the operand address Z is executed to transfer an item, W, from a device specified by the Device Code stored in Memory storage location $Z-1$ to the Ending Item of the list. The nominal computation of the Memory storage location affected is $Z+1+(F+N+1)$ which, in this instance, is simply $Z+2$ since both the F and N Fields contain zero counts. After execution of the IDL command, the list format will be as illustrated in FIGURE 24 where the item W is depicted as stored in Memory storage location $Z+2$. The F Field of the List Control Word has not been modified during the execution of this command because the Beginning Item address has not changed. The N Field has been incremented by a count of one to reflect the new current number of items in the list. The Decide Code stored in Memory storage location $Z-1$ is not affected by execution of the IDL command.

Now consider a second step in which a second IDL command having the operand address Z is executed to tarnsfer a second item, X, to the Ending Item of the list. Again, the nominal computation of the storage location affected is $$Z+1+(F+N+1=Z+1+(O+1+1)=Z+3$$

Figure 25:
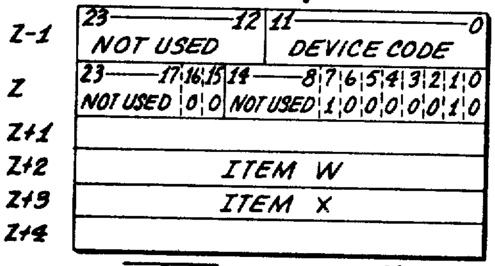

After executing the IDL command, the list format will be as illustrated in FIGURE 25 where it may be observed that the item X has been stored in Memory storage location $Z+3$. The F Field of the List Control Word has not been modified during the execution of this command, but the N Field has again been incremented by a count of one to reflect the current number of items in the list.

Next, consider a third step in which another IDL command having the operand address Z is executed to transfer a third item, Y, to the Ending Item of the list. The computation of the storage location affected is $$Z+1+(F+N+1)=Z+1+(O+2+1)=Z+4$$

Figure 26:
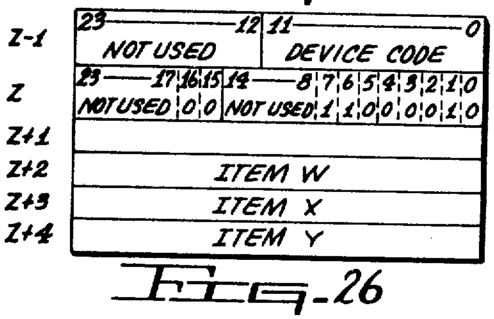

After the execution of the third IDL command is complete, the list format will be as illustrated in FIGURE 26 where it may be observed that item Y has been stored in Memory storage location $Z+4$. The F Field of the List Control Word has not been modified, but the N Field has been incremented by a count of one to reflect the current number of items in the list.

Now consider a fourth step in which another IDL command having the operand address Z is executed to transfer a fourth item, Z, to the Ending Item of the list. The nominal computation of the storage location affected is $Z+1+(F+N+1)$ which now equals $$Z+1+(0+4+1)=Z+5$$

Figure 27:
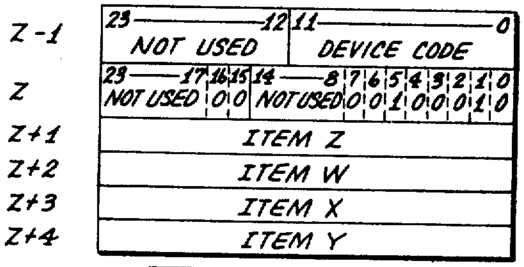

This assumes that bit 8 is now "one." However, the L Field limits the actual computation of the storage location affected to the reserved Memory storage block, and where the count to be added to the address Z exceeds 4 (in this example), the excess of 4 is disregarded such that the actual Memory storage location affected in this fourth step is $Z+1$ rather than $Z+5$, the latter being outside the block. After execution of the fourth IDL command, the list format will be as illustrated in FIGURE 27. Because this operation fills the list, bit 5 of the modified and restored List Control Word is now set to a "one." Since the list is full, any further attempt append an item to the list from the device specified by the Device Code stored in Memory storage location $Z-1$ would cause the generation of an ECHO signal to provide a secondary interrupt to the Automatic Priority Interrupt module 5 which would cause, in turn, a timely transfer of program control to a subroutine provided by the programer for this contingency. This subroutine would recognize the failure of the attempt and initiate appropriate action.

Figure 28:
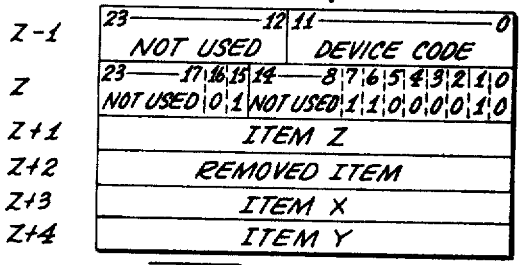

Next, consider a fifth step in which an ODL command is executed to remove the Beginning Item from the list and transfer it to a peripheral device specified by the Device Code stored in Memory storage location $Z-1$. After execution of the ODL command, the list format would be as illustrated in FIGURE 28. It will be observed that the removed item is taken from Memory storage location $Z+2$, the Beginning Item specified by the List Control Word before its modification computed from $$Z+1+(F+1)$$

After modification, the F Field of the List Control Word has been incremented by a count of one and the N Field decremented by a count of one to reflect the current status of the list. In addition, bit 5 of the List Control Word has been cleared to indicate that the list is no longer full.

Figure 29:
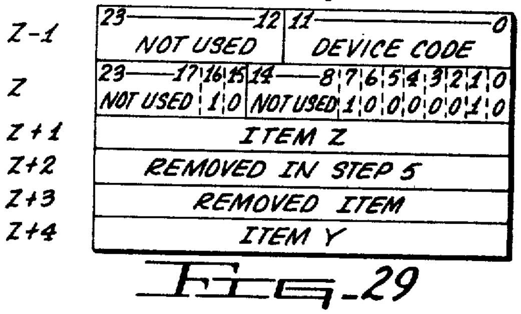

Now consider a sixth step in which a second ODL command has been executed to again remove the Beginning Item from the list and transfer it to the specified Peripheral Control Input/Output Buffer 7. The nominal computation of the Memory storage location affected is $Z+1+(F+1)=Z+1+2=Z+3$. After execution of the second ODL command, the list format would be as illustrated in FIGURE 29. The F Field has again been incremented by a count of one and the N Field decremented by a count of one to reflect the current status of the list.

Figure 30:
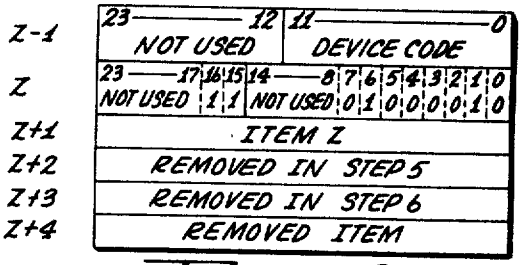

Next, consider a seventh step in which another ODL command is executed to remove the Beginning Item from the list. The computation of the actual Memory storage location affected is $Z+1+(F+1)=Z+4$. After execution of this ODL command, the list format would be as illustrated in FIGURE 30 where it will be observed that item Y has been removed from Memory storage location $Z+4$. The F Field has been incremented by a count of one and the N Field decremented by a count of one to reflect the current status of the list.

Figure 31:
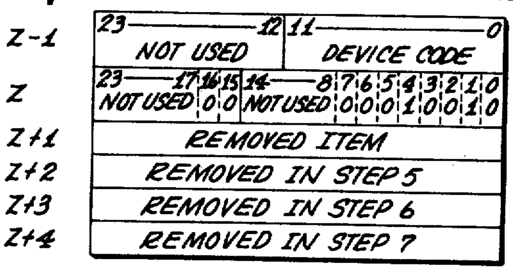

Finally, consider that another ODL command has been executed to again remove the Beginning Item from the list. The nominal computation for the Memory storage location affected is $Z+1+(F+1)=Z+5$. However, as previously mentioned, the L Field limits the effect of a Device command to the reserved Memory block such that the excess of 4 is disregarded and the actual Memory storage location effected is $Z+1$ rather than $Z+5$. After execution of the fourth ODL command, the list format would be as illustrated by FIGURE 31. The F Field has again been incremented by a count of one. The incremention of the F Field has resulted in a carry into bit 17 of the List Control Word and the clearing of bits 15 and 16. This again illustrates the inherent circular characteristic of the list since bit 17 is not considered in the computation of the address of an affected item so long as the maximum list length remains at four items. The N Field has been decremented by one to a total count of zero, and bit 4 of the List Control Word has been set to "one" to indicate that the list is once again empty.

It will be understood, of course, that there is no requirement that the list be filled before the first ODL command can be executed nor that the list be empty before the first IDL command can be executed. The sequence just described is merely convenient for this example and is not atypical because occasion may occur when it is desirable to read-in a group of information words from a peripheral device or read-out a group of information words to a peripheral device in rapid sequence.

The realization of these operations is achieved by the provision of F, N, and I Full Adders of the type with logic characteristics previously tabulated in FIGURE 13*b*. Each Full Adder is provided with a Carry Flip-flop which may be preset if required. Control logic structure associated with the Full Adders is provided to bring about a bit manipulations appropriate for updating the List Control Word during the execution of the IDL and ODL commands as more fully explained below and as illustrated in FIGURES 35 and 36. Specially extended timing for the complete execution of the IDL and ODL commands is set out in the timing diagrams FIGURES 32 and 33, respectively.

Assuming initially that there is no Automatic Priority Interrupt, Sequence Control State 1 of a Device command proceeds in the normal manner described in detail above. Therefore, at the end of Sequence Control State 1 for either of these commands, the I Register 23 will contain the command word, the H Register 26 will contain the operand address portion of the command word which specifies the Memory storage address Z of the List Control Word for the circular list to be placed in communication with a specified peripheral device, and the contents of the P Register 24 will have been incremented by a count of one. In addition to the previously described normal Sequence Control State 1 operations, it may be observed that the F, I, and N Carry Flip-flops (27*a*, 28*b*, and 29*a* respectively) are cleared as a matter of course by the trailing edge of the SC1A signal which is an input to OR gates G140, G172 and G204 as shown in FIGURES 35 and 36.

Assuming that index modification is not specified, a first Sequence Control State 3 is entered following the completion of Sequence Control State 1 for a Device command; and it is during this first Sequence Control State 3 that the critical test and bit manipulations for updating the List Control Word and, if necessary, the generation of an ECHO signal are performed.

During the first Sequence Control State 3, certain manipulations are carried out which are common to both the Device commands. Referring to the timing diagrams FIGURES 32 and 33 is will be observed that the Delay Time Counter 52 is preset to $17_8$ by applying the TP17 signal, which is "one" during the TT1E time of the first Sequence Control State 3, to the clear input of F1TAFF and to the set inputs of F1TBFF–F1TEFF, as illustrated in FIGURE 16. This results in the time extension of the first Sequence Control State 3 because the generation of TLPS is delayed for nine TCKA pulses. During the whole of the first Sequence Control State 3 for the execution of either Device command, the MAMI signal is "one" such that the Memory Address Register 32 is provided with the operand address of a List Control Word from the I Register 23. When the List Control Word is available from the Memory Data Register 33, it is gated to the B Register 25 by the BDOB signal which becomes "one" during TCT2 time. The List Control Word immediately also appears in the PAU 20 because the UBUA and UBLA signals are held at "one" during the whole of Sequence Control State 3 to gate the contents of the B Register 25 to the PAU 20. During TCT3 time, the "one's" complement of the L Field of the List Control Word is gated from the PAU 20 to the J Counter 30 by the JNUJ signal as shown in FIGURE 34. The bit position 4 Flip-flop of the J Counter 30 is always set by the JNUJ signal when that signal is "one" during the first Sequence Control State 3 for the Device commands.

After these operations and at the beginning of TT4E time for the first Sequence Control State 3 of the IDL and ODL commands, the List Control Word is contained within the B Register 25, the Delay Time Counter 52 has been preset to $17_8$, the J Counter 30 has been set to the "ones" complement of the binary number contained in the L Field (bits 3–0 of the List Control Word), the I Register 23 contains the Device command being executed, the H Register 26 contains the Memory storage location address of the List Control Word, and the PAU 20 output signals represent the List Control Word because the UBUA and UBLA signals are held at "one".

Modification to the List Control Word always takes place during the first Sequence Control State 3 of a Device command. As previously mentioned, the modifications which occur during the execution of an IDL command are an addition of one count to the N Field and bit 5 must be set if the list becomes full with the execution of the instant IDL command. For reasons which will become more apparent below, the unmodified F Field is also shifted to the I Register 23 bit positions 8–0. In addition, a test is made at the end of the first Sequence Control State 3 to determine whether the list is currently full such that the IDL command cannot be successfully executed. The ECHO signal is also generated during the first Sequence Control State 3 if the IDL command cannot be successfully executed because the list is full.

Considering now the IDL command specifically, with reference to its timing diagram FIGURE 32, it will be observed that the DIDL signal is "one" when the Operation Code of the IDL command is in the I Register 23. FIGURE 35 shows logic for accomplishing the movement of the unmodified F Field to the I Register 23 bit positions 8–0. The number of bits which are to be shifted from the F Field of the List Control Word in the B Register 25 to the I Register 23 bit positions 8–0 is determined by the length of the list as reflected in the count to which the J Counter 30 has been set; i.e., the "one's" complement of the L Field. It will be observed that the "zero" output from the B Register 25 bit position 15 flip-flop is connected directly to the A input of the I Full Adder 28. The S and $\overline{S}$ outputs from the I Full Adder 28 are connected to one input of AND gates G122 and G121, respectively, and the other input of each of these gates is connected to the output from another AND gate G119. One input of the AND gate G119 is activated by the ISFT signal.

The ISFT signal is "one" in coincidence with TCKA during the extended TT4E time of the first Sequence Control State 3 for the Device commands until the Delay Time Counter complete condition is attained. Since the Delay Time Counter 51 will have been preset to $17_8$ as explained above, there will be a string of nine ISFT pulses, as shown in the timing diagrams FIGURES 32 and 33 before the TPI3 signal becomes "one." The remaining input to the AND gate G119 is enabled by the $\overline{\text{JO37}}$ signal which remains "one" until the J Counter 30 has been incremented successively to a count of $37_8$. As shown in FIGURE 34, the J Counter 30 is incremented by the JINC signal which is "one" in synchronism with ISFT until the $37_8$ count is attained. Thus, from one to nine JINC pulses will be generated depending upon the count to which the J Counter 30 was preset.

AND gate G120 also has one input activated by the ISFT signal, but its other input is enabled only when the J Counter 30 reaches a count of $37_8$; i.e., when the signal JO37 becomes "one." The output signals from the AND gates G120 and G121 are inputs to an OR gate G123. The output from OR gate G123 is applied to the clear input of the I Register 23 bit position 8 flip-flop. The output signal from the AND gate G122 is applied to the set input of the same flip-flop. One input of each of the AND gates G124–G139 is activated by the ISFT signal to permit right shifting of this portion of the I Register 23. So long as the J Counter 30 has not reached a count of $37_8$, the AND gate G119 will be enabled with each ISFT pulse to enable one input of each of AND gates G121 and G122. One or the other of these gates will be fully enabled by each IFST pulse according to the instantaneous state of the S and $\overline{S}$ outputs from the I Full Adder 28. Thus, if AND gate G122 is enabled, the I Register 23 bit position 8 flip-flop will be set at the trailing edge of the ISFT pulse. When the J Counter 30 reaches a count of $37_8$, the number of binary digits required to specify the relative address of the specific item of interest in the list will have been shifted out of the B Register 25 bit position 15 flip-flop, and further shifting through AND gates G121 and G122 will not take place because the AND gate G119 will now be disabled. However, the AND gate G120 will now be enabled with each ISFT pulse because the JO37 signal is "one." The OR gate G123 will therefore be enabled to shift a "zero" into the I Register 23 bit position 8 flip-flop with each ISFT pulse. In this manner, only that part of the F Field of the List Control Word which is appropriate to specify relatively the specific item of interest in a circular list will be shifted into the I Register 23 and properly positioned.

The N field of the List Control Word is held in the B Register 25 bit positions 14–6 both before and after modification to the List Control Word. Referring now to FIGURE 36, it will be observed that at the beginning of the first Sequence Control State 3, the N Carry Flip-Flop **29*a* is in the cleared state because the SC1A signal was previously applied to its clear input through the OR gate G140. However, the DIDL signal enables the OR gate G210, and during TCT3 time, AND gate G141 will be enabled. A "one" output from AND gate G141 will enable OR gate G142 which drives the set input of the N Carry Flip-flop 29*a*. Therefore, the N carry Flip-flop 29*a* is set before any addition takes place within the N Full Adder 29, and the P input to the N Full Adder 29 is enabled before the first ISFT pulse arises since it is driven by the "zero" output from the N Carry Flip-flop 29*a***.

One input of a NAND gate G143 is enabled during the whole of Sequence Control State 3 by the SC3A signal, and its other input is connected to the "one" output from the B register 25 bit position 6 flip-flop. When the ISFT pulse train is generated, circular shifting of the N Field of the List Control Word takes place through the N Full Adder 29. The ISFT pulses are applied to one input of each of the AND gates G144–G161 to permit serial right shifting of the N Field portion of the B Register 25. The C and $\overline{C}$ outputs from the N Full Adder 29 are connected to one input respectively of AND gates G162 and G163. The remaining input of each of these gates is driven by the ISFT signal. The output from AND gate G162 is utilized as an input to the OR gate G142 which, as noted above, drives the set side of the N Carry Flip-flop **29*a*. In a like manner, the output from AND gate G163 is an input to the OR gate G140 which drives the clear side of the N Carry Flip-flop 29*a*. With this arrangement, normal carry propagation is achieved during the serial addition because the "zero" output from the N Carry Flip-flop 29*a* is connected directly to the P input of the N Full Adder 29** to enable or disable that input for the next serial addition depending upon whether or not a carry resulted from a just-completed serial addition.

A test must be made in conjunction with the N Field incrementation to determine whether the list is full as specified by the modified N Field. For this purpose, a List Complete Flip-flop F1XLCP is provided as shown in FIGURE 36. At TCT3 time of Sequence Control State 3, an AND gate G164 is enabled to preset the List Complete Flip-flop F1XLCP. Another AND gate G165, which has its output connected to the clear input of the List Complete Flip-flop, has as input signals $\overline{\text{J037}}$, ISFT, and the S output signal from the N Full Adder 29. With this arrangement, G165 will be enabled in synchronism with the ISFT pulse whenever the S output from the N Full Adder 29 is "one" and the J Counter 30 has not reached a count of $37_8$. If this condition occurs for any one of the nine ISFT pulses, G165 will be enabled to clear the List Complete Flip-flop F1XLCP. That is, if a "one" is shifted from the N Full Adder S output into the B Register 25 bit position 14 flip-flop during the modification to the N Field, G165 will be enabled to clear the List Complete Flip-flop if the signal $\overline{\text{J037}}$ is "one." If the list does become full, all the significant bits of the N Field will be "zero" since they must all have been "one" before modification, and the next bit, which would be a "one" to represent the resulting carry, is not propagated because only the significant bits are considered due to the influence of the L Field as reflected in the $\overline{\text{J037}}$ signal. Under these conditions, the List Complete Flip-flop F1XLCP remains set.

The "one" output from the List Complete Flip-flop F1XLCP drives one input of an AND gate G184 which also has SC3A and TLPS signal inputs. The output from G184 is one of two inputs to another AND gate G166; the remaining input of AND gate G166 is already enabled by the output from an OR gate G183 which is enabled, inter alia, by the DIDL signal. If the list has become full, AND gate G184, and hence AND gate G166, will be enabled at TLPS of the first Sequence Control State 3 of the IDL command to provide a set input signal to the B Register 25 bit position 5 flip-flop. The B Register bit position 4 flip-flop is always cleared at TLPS of Sequence Control State 3 of the IDL command by the enabling of an AND gate G167, which also has one input enabled by the output from OR gate G183, because the list can never be empty after the completion, successful or unsuccessful, of an IDL command.

A test must be made at the end of the first Sequence Control State 3 during the execution of an IDL command to determine whether the list is currently full, as indicated by a "one" bit 5 of the List Control Word before its modification. Referring again to FIGURE 36, it will be observed that when the DIDL signal is "one" to enable the OR gate G183, an AND gate G174 will be enabled during the whole of Sequence Control State 3 if, and only if, the B Register 25 bit position 5 flip-flop is set. This last condition is tested by providing the "one" output signal from the B Register 25 bit position 5 flip-flop as one of the inputs to an AND gate G174. If the B Register 25 bit position 5 flip-flop is set, the output signal from AND gate G174 will be "one" and this signal will enable an OR gate G175. The output signal from OR gate G175 is applied to one input of an AND gate G176 which has TLPS as its other input signal. Therefore, G176 will be enabled at TLPS of the first Sequence Control State 3 of the IDL command if the B Register 25 bit position 5 flip-flop is set. At the trailing edge of TLPS, the Sequence Control State 1 Flip-flop, F1SCO1, will be set by the output signal from OR gate G177 which is enabled by, inter alia, the output signal from AND gate G176. The other input to the OR gate G177, unlabeled in FIGURE 36, represents the many conditions which cause Sequence Control State 1 to be entered periodically during the execution of various commands of a running program.

It will be remembered that if Sequence Control State 1 is entered following the first Sequence Control State 3 of an IDL command, the P Register 24 will contain the first sequential Memory storage address from that which it contained just before the IDL command execution was commenced because it was incremented during Sequence Control State 1. Therefore, program control will be transferred to the command stored in that first sequential storage location, and no storage of information will take place nor will the modified List Control Word be stored.

It may be observed that if the AND gate G178 should be enabled because the B Register 25 bit position 4 flip-flop is set, OR gate G175, AND gate G176, and OR gate G177 will also be enabled at TLPS of the first Sequence Control State 3. This contingency will be discussed below with respect to a list empty test. On the other hand, if neither B register 25 bit positions 5 or 4 flip-flops are set, NOR gate G179 will be enabled since the AND gates G174 and G178 must both be disabled. Therefore, AND gate G180, rather than AND gate G176, will be enabled at TLPS, and the output signal from AND gate G180 will enable OR gate G181. At the trailing edge of TLPS, the Sequence Control State 4 Flip-flop will be set to permit full execution of the IDL command. The other inputs to OR gate G181, unlabeled in FIGURE 36, represent the many conditions which cause Sequence Control State 4 to be entered periodically during the execution of various commands of a running program.

The operations carried out during the first Sequence Control State 4 of a fully executed IDL command may best be understood with reference to the IDL timing diagram, FIGURE 32, and to FIGURE 37 which is a block diagram of the information movements occurring among the various registers during the first Sequence Control State 4.

The MAMH signal is "one" during the whole of the first Sequence Control State 4 to gate the contents of the H Register 26 to the Memory Address Register 32. The modified List Control Word temporarily stored in the B Register 25 is gated to the Memory Data Register 33 by the DBDR signal and is stored into Memory storage location Z which is the address transferred from the H Register 26 to the Memory Address Register 32. Still assuming that the IDL command is not the result of an Automatic Priority Interrupt, the P Register 24 is incremented by a second count of one. This second incrementation is achieved by gating the contents of the P Register 24 and a count of one to the PAU 20 by the UPAU and UENC signals respectively during TCTA time. The sum represented by the output signals from the PAU 20 is gated back to the P Register 24 by the PAUP signal which arises during TCT2 time of the first Sequence Control State 4.

During TCTS time of the first Sequence Control State 4, the contents of the I Register 23 bit positions 8–0, the contents of the H Register 26 (Z), and a count of one are simultaneously gated to the PAU 20 by the UIAU, UHAU, and UENC signals respectively. The sum which then appears as output signals from the PAU 20 is the actual address of the Memory storage location into which the information word from the designated peripheral device is to be stored. This address is gated from the PAU 20 to the I Register 23 bit positions A, B, 13–0 in synchronism with TLPS of the first Sequence Control State 4 by the IAUI signal.

At the trailing edge of TLPS of the first Sequence Control State 4, Sequence Control State 5 is entered for the first time. The purpose of this first Sequence Control State 5 is to generate the address $Z-1$ which is the Memory storage location containing the Device Code identifying the specific Peripheral Control Input/Output Buffer 7 and Peripheral Device 8 from which an information word is to be read-in.

Referring to the IDL timing diagram FIGURE 32 and to the block diagram FIGURE 38, which shows the information movement occurring among the various registers during this first Sequence Control State 5, it will be observed that the contents of the H Register 26 (Z) and "one's" are impressed on the PAU 20 by the UHAU and U1AU signals respectively during TCTA time. The net result reflected in the output signals from the PAU 20 is a subtraction of one from the H Register 26 count. This conventional binary decrementation may be illustrated by the following example in which four bit words are used for simplicity.

Original count = 1001 = 9
Force count = 1111
Result (1) 1000 = 8

The decremented H Register count ($Z-1$) is gated back to the H Register 26 from the PAU 20 by the trailing edge of the HAUH signal which arises in coincidence with TCKA during TT2E time.

As shown in FIGURE 39, the trailing edge of the SC5A signal is utilized to set an F1SI02 Flip-flop to permit a double pass through Sequence Control States 3, 4, and 5 and to provide additional influence upon the timing as may be required to read-in the information word from the designated Peripheral Device 8. At the completion of the first Sequence Control State 5 for the IDL command, Sequence Control State 3 is reentered.

The purpose of the second Sequence Control State 3 during the execution of the IDL command is to fetch the Device Code from its Memory storage location $Z-1$ into the H Register 26. Referring to the IDL command timing diagram FIGURE 32 and to FIGURE 40 which shows the information flow occurring among the various registers during the second Sequence Control State 3, it will be observed that the MAMH signal is "one" during the whole of this second Sequence Control State 3 such that the Device Code stored in Memory storage location $Z-1$ is placed into the Memory Data Register 33. When the Device Code is available from the Memory Data Register 33, the BDOB signal becomes "one" to gate the Device Code to the B Register 25. The UBLA signal is "one" during the whole of the second Sequence Control State 3 so that the Device Code is gated from the B Register 25 and impressed on the PAU 20. The HAUH signal arises in synchronism with the TLPS signal of the second Sequence Control State 3 to gate the output signals from the PAU 20 to the H Register 26. Thus, at the end of the second Sequence Control State 3, the H Register contains the Device Code which is available for decoding to further implement the IDL command. At the trailing edge of TLPS of the second Sequence Control State 3, the second Sequence Control State 4 of the IDL command is entered to fully establish the information flow paths between the selected Peripheral Control Input/Output Buffer 7 and Peripheral Device 8 and the B Register 25 and to provide an appropriately extended period of time to establish time compatability with the Arithmetic Unit 1.

Referring now to the block diagram of FIGURE 41 and the IDL timing diagram, FIGURE 32, the I/O Selector Hub 31 is shown in sub-block form, and the information flow paths established during the second Sequence Control States 4 and 5 are illustrated. The I/O Device Decoder 31a is in communication with Instruction Decoding to decode the Device Code held in the H Register 26 in order to generate the signals necessary for selecting the specified Peripheral Control Input/Output Buffer 7 and Peripheral Device 8 and to provide time compatability with the Arithmetic Unit 1. The type of Peripheral Device 8 selected may be reflected in an output signal from the I/O Device Decoder 31a to the I/O Timing Block 31b. I/O Timing Signal Generation 31b is influenced by the device type and by the normal timing signals available in the Arithmetic Unit 1 as well as by the state of the F1SI02 flip-flop combined in any convenient manner to provide an output signal to enable, for an appropriate period, one input each of a set of AND gates which establish communication between the several input/output channels and the PAU 20. Another output signal from the I/O Device Decoder 31a selects the specific channel by enabling a second input to a single group of twenty-four AND gates through which the information from the appropriate Peripheral Control Input/Output Buffer 7 will pass. The AND gate 31c symbolically represents the twenty-four selected AND gates for the specified channel. A third input to each of the twenty-four AND gates 31c are driven from twenty-four flip-flops comprising an output register within the Peripheral Control Input/Output Buffer 7. The UIOA signal gates the information from the I/O Selector Hub 31 to the PAU 20.

The BAUB signal is "one" in synchronism with TLPS of the second Sequence Control State 4 to gate the output signals from the PAU 20 to the B Register 25. Following the second Sequence Control State 4 of the IDL command, Sequence Control State 5 is entered.

During the whole of the second Sequence Control State 5, Memory is addressed from the I Register 23 which contains, in its operand address portion, the Ending Item address, formed during the first Sequence Control State 3. The DBDR signal becomes "one" during TCTS time of the second Sequence Control State 5 to gate the read-in information word to the Memory Data Register 33.

At the trailing edge of TLPS for the second Sequence Control State 5, Sequence Control State 1 is reentered to fetch the next command from the Memory storage location specified by the contents of the P Register 24.

The Peripheral Device 8 communicates with the timing and the logic of the Peripheral Control Input/Output Buffer 7 to place the information into the buffer output register at an optimum rate of speed. Since the Peripheral Device 8 may be a relatively low speed device, it may be necessary to execute IDL commands at relatively long time intervals even when the Peripheral Device 8 is functioning at or near its highest speed. Thus, it may be convenient to use the IDL command with the Automatic Priority Interrupt module 5 to cause the information processing system to operate at an optimum speed.

Referring now to FIGURE 42 and the IDL timing diagram FIGURE 32, the relationship between the Automatic Priority Interrupt module 5 with the Arithmetic Unit 1 and with a selected Peripheral Control Input/Output Buffer 7 and Peripheral Device 8 is shown in block form. The Automatic Priority Interrupt module 5 searches asynchronously from the Arithmetic Unit 1. This is, the logic of the Automatic Priority Interrupt module 5 examins each of a plurality of interrupt inputs in the order of their priority until it detects an input signal. An input signal, for example, may indicate that a particular Peripheral Control Input/Output Buffer 7 has a complete information word contained within its buffer output register which may be read into the Arithmetic Unit 1 at the convenience of the running program. An interrupt address register contained within the Automatic Priority Interrupt module 5 will, in this instance, contain the Memory storage location address of an IDL command. When such an interrupt is detected, the Automatic Priority Interrupt module 5 sends a request signal to the Arithmetic Unit/Automatic Priority Interrupt Interface and Control block within the Arithmetic Unit 1. When an instant is reached during the course of the running program when it is safe to read-in the information word held in the Peripheral Control Input/Output Buffer 7 which issued the interrupt signal, timing synchronization is established between the Arithmetic Unit 1 and the Automatic Priority Interrupt module 5 to permit the interrupt address to be transferred from an Interrupt Address Register within the Automatic Priority Interrupt module 5 to the Memory Address Register 32. Under these conditions, the MINT signal rather than the MAMP signal is "one" during the whole of Sequence Control State 1 of the IDL command.

The execution of the fetched IDL command is then as described in detail above. If it is determined during the first Sequence Control State 3 that the list is full, the ECHO signal is generated as another input to the Automatic Priority Interrupt module 5 to include this condition and may be utilized to cause a new interrupt to institute a subroutine for appropriate action. The derivation of the ECHO signal is shown in FIGURE 42. One input to an AND gate G700 is from the "one" output from the B Register 25 bit position 5 flip-flop. The remaining inputs to G700 are the DIDL and SC3A signals. Therefore, if the B Register 25 bit position 5 flip-flop is set during the first Sequence Control State 3 of the IDL command, G700 will be enabled. The output signal from G700 is one input to an OR gate G702 which drives one input to another AND gate G703. The remaining input to the AND gate G703 is the TT4E signal; thus, if the addressed list is full when an attempt is made to execute the IDL command, the ECHO signal will be generated continuously during TT4E time of the first Sequence Control State 3.

If the IDL command is the result of an Automatic Priority Interrupt and the list is not full, the PAUP signal is inhibited from becoming "one" during the first Sequence Control State 4 so that the P Register 24 will not be incremented a second time during the execution of the IDL command.

The functioning of the ODL command is closely related to that of the IDL command as may be appreciated by reference to its timing diagram FIGURE 33 and to the block diagram FIGURE 43.

The DODL signal is "one" when the ODL operation code is decoded from the I Register 23 bit position 23–18. Following a normal Sequence Control State 1 and assuming that no index modification is specified, Sequence Control State 3 is entered for the first time. As previously mentioned, the modifications to the List Control Word which must take place during the first Sequence Control State 3 of the execution of an ODL command are: (a) an addition of one to the F Field, (b) a substraction of one from the N Field, and (c) the setting of bit 4 of the List Control Word if the list becomes empty with the execution of the instant ODL command. A count of $F+1$ is also shifted to the I Register 23 bit position 8–0 in preparation for determining the exact Memory storage location from which an information word is to be extracted.

The logic for accomplishing the addition of one to the F Field and the movement of the unmodified F Field plus a count of one to the I Register 23 bit position 8–0 is shown in FIGURE 35. As with the IDL command, one input of the NAND gate G100 is enabled during the whole of the first Sequence Control State 3 by the SC3A signal such that the "one" output from the B Register 25 bit position 15 flip-flop is effectively inverted and applied to the A input of the F Full Adder 27. In addition, the SC3A signal enables one input of another NAND gate G200. The remaining input of G200 is driven from the "one" output from the F Carry Flip-flop **27*a*, and the output from G200 is connected to the P input of the F Full Adder 27. It will be observed that at the beginning of the first Sequence Control State 3 during the execution of an ODL command, the F Carry Flip-flop 27*a* is in the cleared state because of the SC1A signal was previously applied to the clear input through an OR gate G204. However, the DODL signal enables the OR gate G210, and its output is applied as one input to an AND gate G205 which becomes fully enabled at TCT3 time of Sequence Control State 3. The output signal from G205 is one input to another OR gate G202 which drives the set input of the F Carry Flip-flop 27*a*. Therefore, the F Carry Flip-flop 27*a* is set before any addition takes place within the F Full Adder 27, and the P input to the F Full Adder 27 is enabled before the first ISFT pulse is generated. Hence, when the train of nine ISFT pulses is generated, the F Field of the List Control Word is circulated through the F Full Adder 27 and returned to its original position in the B Register 25 after being incremented by one because of the presetting of the F Carry Flip-flop 27*a***.

The number of bits which are to be shifted from the F Field in the B Register 25 to the I Register 23 bit position 8–0 is determined in the same manner as previously descrbied for the IDL command. However, the actual count to be shifted into the I Register 23, in the case of the ODL command, must be the unmodified F Field plus an additional count of one. This addition of one count is achieved by presetting the I Carry Flip-flop **28*a*. As shown in FIGURE 35, the DODL signal enables an OR gate G168, and the output signal from G168 is applied to one input of an AND gate G206 having as its other inputs the SC3A and TCT3 signals. When AND gate G206 is enabled, its output signal enables an OR gate G170 which drives the set input of the I Carry Flip-flop 28*a*. The "zero" output from the I Carry Flip-flop 28*a* is connected directly to the I Full Adder 28 P input. Therefore, the P input of the I Full Adder 28 is enabled before the train of ISFT pulses arises. The ISFT train shifts the F Field through the I Full Adder 28 and into the I Register 23 bit positions 8–0 in the same manner as previously described for the IDL command. The net result in the I Register 23 bit position 8–0 is the sum of the F Field plus a count of one resulting from the presetting of the I Carry Flip-flop 28*a***.

The N Field must be decremented by a count of one during the first Sequence Control State 3 of the execution of an ODL command. This is achieved by logic shown in FIGURE 36. One input to the NAND gate G143 is enabled by the SC3A signal, and its remaining input is connected directly to the "one" output from the B Register 25 bit position 6 flip-flop, the signal from which is thereby effectively inverted and applied to the A input of the N Full Adder 29. The B input of the N Full Adder 29 is forced by the DODL signal which is effectively inverted through the NOR gate G207. The N Carry Flip-flop 29, previously cleared by the trailing edge of the SC1A signal applied to the OR gate G140, is not preset and so operates to provide only normal carry propagation. The net result of forcing the B input of the N Full Adder 29 while circulating the N Field through the A input when the train of ISFT pulses is generated is a subtraction of one from the N Field which will have returned to its original position in the B register 25 after the ninth ISFT pulse.

The List Complete Flip-flop, F1XLCP, monitors the S output from the N Full Adder 29 to determine whether the list becomes empty after execution of the instant ODL command, as indicated by the modified N Field and the L Field. As with the IDL command, the List Complete Flip-flop is preset at TCT3 time of Sequence Control State 3 by the enabling of the AND gate G164. The AND gate G165, which drives the clear input to F1XLCP, will be enabled in synchronism with the ISFT pulse whenever the S output from the N Full Adder is "one" and the J Counter 30 has not reached a count of $37_8$. If this condition occurs for any one of the nine ISFT pulses, G165 will be enabled to clear the List Complete Flip-flop F1XLCP. However, if the list does become empty, all the significant bits of the N Field as specified by the L Field will be "zero," and the List Complete Flip-flop F1XLCP will not be cleared.

The "one" output from the List Complete Flip-flop drives one input of the AND gate G184 which also has as signal inputs SC3A and TLPS. If the list has become empty, G184 will be enabled at TLPS of the first Sequence Control State 3 of the ODL command to enable one input of the AND gate G208. The other input to AND gate G208 will already be enabled by the output from an OR gate G182 which has the DODL signal as one input. Therefore, the B Register 25 bit position 4 flip-flop will be set at the trailing edge of TLPS of the first Sequence Control State 3 of the ODL command if the List Complete Flip-flop F1XLCP has remained set. The B Register 25 bit position 5 flip-flop is always cleared at TLPS of Sequence Control State 3 of the ODL command by the enabling of AND gates G211 and G209 because a list can never be full after the completion, successful or unsuccessful, of an ODL command.

At the end of the first Sequence Control State 3 for the ODL command, a test must be made to determine whether the list is currently empty as specified by the List Control Word before modification. As shown in FIGURE 36, one input to the AND gate G178 is the output signal from the OR gate G182 which will be enabled by the DODL signal. The other inputs to AND gate G178 are the SC3A signal and the "one" output from the B register 25 bits position 4 flip-flop. Therefore, the AND gate G178 will be enabled during the whole of the first Sequence Control State 3 of the ODL command if, and only if, the B Register 25 bit position 4 flip-flop is set. If this condition is present, the OR gate G175 is also enabled by the output signal from G178, and the G175 output signal enables one input of the AND gate G176. The other input of G176 will become enabled at TLPS of the first Sequence Control State 3 for the ODL command, and, at the trailing edge of TLPS, the Sequence Control State 1 Flip-flop will be set by the output signal from the OR gate G177 which is driven by G176. It will be observed that, at this instant, the P Register 24 will contain the first sequential Memory storage location address from that which it contained when the ODL command was called into the Arithmetic Unit 1 for execution because the P Register 24 was incremented during Sequence Control State 1. Therefore, program control will be transferred to the command stored in that first sequential Memory storage location, and the modified List Control Word will not be stored. On the other hand, if neither the B Register 25 bit positions 5 or 4 flip-flops are set, the NOR gate G179 will be enabled because the AND gates G174 and G178 must both be disabled. With the latter condition, the AND gate G180, rather than G176, will be enabled at TLPS to enable the OR gate G181. The output signal from OR gate G181 sets the Sequence Control State 4 Flip-flop so that the ODL command can be fully executed.

If it is determined during the first Sequence Control State 3 that the list is empty, the ECHO signal is generated as an input to the Automatic Priority Interrupt module 5 in a manner similar to that described for the IDL command above. Referring again to FIGURE 42, it will be observed that one input to an AND gate G701 is from the "one" output from the B register 25 bit position 4 flip-flop. The remaining inputs to G701 are the DODL and the SC3A signals. Therefore, if the B Register 25 bit position 4 flip-flop is set during the first Sequence Control State 3 of the ODL command, G701 will be enabled. The output from G701 is an input to an OR gate G702 which drives one input to another AND gate G703. The remaining input to the AND gate G703 is the TT4E signal; thus, if the addressed list is empty when an attempt is made to execute the ODL command, the ECHO signal will be generated continuously during TT4E time of the first Sequence Control State 3.

The first Sequence Control States 4 and 5 and the second Sequence Control State 3 of the ODL command are identical to the equivalent Sequence Control States entered during the execution of the IDL command and described above. As with the IDL command, if the ODL command is the result of an Automatic Priority Interrupt and the list is not complete (empty), the signal PAUP is inhibited during the first Sequence Control State 4 to prevent the second incrementation of the P Register 24.

During the second Sequence Control State 4 of the execution of an ODL command, output signals from the Device Decoder **31*a* and the I/O Timing Signal Generator 31*b* enable two inputs each of a group of twenty-four AND gates, represented by the AND gate 31*d* in FIGURE 43, which drive the buffer input register of the selected Peripheral Control Input/Output Buffer 7. The output signals UN00UN23 from the PAU 20, which represents the information word to be transferred to the selected Peripheral Device 8**, are always impressed upon the remaining input of each of the twenty-four AND gates for the selected channel and for all other channels.

Sequence Control State 5 of the ODL command proceeds as described above for the IDL command, but its function with the ODL command is simply a sequencing link to the subsequent Sequence Control State 1.

The DABL, DAEL, DRBL, and DREL signals, shown as inputs to various gates in FIGURES 35 and 36, do not become "one" at any time during the execution of the Device commands.

What is claimed is:

1. An information processing system including memory means and a plurality of peripheral buffers, each of which contains a plurality of information words, and apparatus for providing communication between said peripheral buffers and said memory means, comprising:

(a) a first register for temporarily storing the command word of an instruction to be executed by said information processing system, said command word including an operand address portion and an operation code portion indicative of desired information transfer;

(b) addressing means responsive to the operand address portion for selecting in said memory means a first storage location containing a control word which comprises a first field specifying a block of storage locations in said memory means which are identified with said control word, a second field specifying a beginning information word in said block of storage locations, and a third field specifying the number of information words currently stored in said block;

(c) a second register for temporarily storing the operand address portion of said command word;

(d) a third register in communication with said memory means;

(e) first means responsive to the selection provided by said addressing means for transferring said control word from the first storage location to said third register;

(f) testing means for testing said third field of said control word temporarily stored in said third register for sensing a list availability determined by the number of information words in said block of storage locations, and means including in said testing means responsive to the detecton of the list availability for generating an available signal;

(g) means responsive to the operation code portion of said command word in said first register for providing a second signal;

(h) combining means for combining in response to said second signal at least said second field of the control word temporarily stored in said third register with the operand address temporarily stored in said second register, to select a second storage location in said memory means with which a peripheral buffer is to communicate;

(i) second means responsive to the selection provided by said adressing means for selecting a third storage location in said memory means having located therein a device code word;

(j) first means responsive to said available signal for transferring said device code word to said second register;

(k) means for decoding the device code word temporarily stored in said second register for selecting of a particular peripheral buffer; and (l) second means responsive to said available signal for transferring an information word between the second storage location and said peripheral buffer.

2. An information processing system as recited in claim 1 including a fourth register for temporarily storing the memory address of the instruction being executed by said information processing system, means for incrementing the address temporarily stored in said fourth register and inhibitable means responsive to the generation of said available signal for incrementing the memory address temporarly stored in said fourth register a second time.

3. An information processing system as recited in claim 2 including automatic priority interrupt means randomly providing an interrupt signal, and means detecting said interrupt signal to inhibit said inhibitable means such that the memory address temporarily stored in said fourth register is not incremented a second time.

4. An information processing system as recited in claim 1, further comprising means for testing said first field of said control word temporarily stored in said third register to detect a list length indicating the maximum number of information words which can be stored in said block of locations, a maximum fifth register, and means such that the memory address temporarily stored word temporarily stored in said third register into said fifth register until said maximum list length is obtained, to thereby develop a modified second field in said fifth register, said combining means adding in response to said second signal at least said modified second field of the control word temporarily stored in said fifth register with the operand address temporarily stored in said second register, to provide the identification of a second storage location.

5. An information processing system comprising memory means and a plurality of peripheral buffers, each of which includes a plurality of information words, and apparatus for providing communication between said peripheral buffers and said memory means, comprising:

(a) a first register for temporarily storing the command word of an instruction to be executed by said information processing system, said command word including an operand address portion;

(b) addressing means responsive to the operand address portion for selecting in said memory means a first storage location containing a control word which comprises a first field specifying a block of storage locations in said memory means which are identified with said control word, a second field specifying a beginning information word in said block of storage locations, third field specifying the number of information words currently stored in said block, and a fourth field specifying whether the block is currently filled by information words;

(c) a second register for temporarily storing the operand address portion of said command word;

(d) a third register in communication with said memory means;

(e) first means responsive to the selection provided by said addressing means for transferring said control word from the first storage location to said third register;

(f) testing means for testing said fourth field of the control word temporarily stored in said third register to sense either a list full or a non-list full condition, and means included in said testing means responsive to a sensing of the non-list full condition for generating an available signal indicating the availability of storage locations within said block to receive information words;

(g) combining means for adding said second and said third fields of said control word temporarily stored in said third register to the operand address temporarily stored in said second register plus and additional increment to select a second storage location in said memory means to which an information word is to be transferred from a peripheral buffer;

(h) second means responsive to the selection provided by said addressing means for seelcting a third storage location in said memory means having located therein a device code word;

(i) first means responsive to said available signal for transferring said device code word to said second register;

(j) means for decoding the device code word temporarily stored in said second register for selecting a particular peripheral buffer;

(k) second means responsive to said available signal for transferring an information word from said peripheral buffer to the second storage location;

(l) means for incrementing said third field of said control word temporarily stored in said third register, and means for comparing said incremented third field and said first field to change said fourth field if the block is currently full, thereby developing a modified control word, and (m) third means responsive to said available signal for storing said modified control word into the first storage location in said memory means.

6. An information processing system as recited in claim 5 further including a fourth register for temporarily storing the memory address of the instruction being executed by said information processing system, means for incrementing the memory address temporarily stored in said fourth register, inhibitable means responsive to the generation of said available signal for incrementing the memory address temporarily stored in said fourth register a second time, automatic priority interrupt means randomly providing an interrupt signal, and means detecting said interrupt signal to inhibit said inhibitable means such that the memory address temporarily stored in said fourth register is not incremented a second time.

7. An information processing system as recited in claim 5, further comprising means for testing said first field of said control word temporarily stored in said third register to detect a maximum list length indicating the maximum number of information words which can be stored in said block of storage locations, a fifth register, and means for transferring said second field of said control word temporarily stored in said third register into said fifth register until said list length is obtained, to thereby develop a modified second field in said fifth register, said combining means adding said modified second field temporarily stored in said fifth register and said third field temporarily stored in said third register to the operand address temporarily stored in said second register plus an additional increment to provide the identification of a second storage location.

8. An information processing system comprising memory means and a plurality of peripheral buffers, each of which includes a plurality of information words, and apparatus for providing communication between said peripheral buffers and said memory means, comprising:

(a) a first register for temporarily storing the command word of an instruction to be executed by said information processing system, the command word including an operand address portion;

(b) addressing means responsive to the operand address portion for selecting in said memory means a first storage location containing a control word which comprises a first field specifying a block of storage locations in said memory means which are identified with said control word, a second field specifying a beginning information word in said block of storage locations, a third field specifying the number of inmation words currently stored in said block, and a fourth field specifying whether the block is currently empty;

(c) a second register temporarily storing the operand address portion of said command word;

(d) a third register in communication with said memory means;

(e) first means responsive to the selection provided by said addressing means for transferring said control word from the first storage location in said memory means to said third register;

(f) testing means for testing said fourth field to sense either a list empty or a non-list empty condition, and means included in said testing means responsive to a sensing of the non-list empty condition for generating an available signal indicating the availability of storage loactions within said block to receive information words;

(g) combining means for adding said second field of said control word temporarily stored in said third register to the operand address temporarily stored in said second register plus an additional increment, to select a second storage location in said memory means from which an information word is to be transferred to a peripheral buffer;

(h) second means responsive to the selection provided by said addressing means for selecting a third storage location in said memory means having located therein a device code word;

(i) first means responsive to said available signal for transferring said device code word to said second register;

(j) means for decoding the device code word temporarily stored in said second register for selecting a particular peripheral buffer;

(k) second means responsive to said available signal for transferring an information word form the second storage location to said peripheral buffer;

(l) means for incrementing said second field and decrementing said third field of said control word temporarily stored in said third register, and means for comparing said decremented third field and said first field to change said fourth field if the block is currently empty, thereby developing a modified control word, and (m) third means responsive to said available signal for storing said modified control word into the first storage location in said memory means.

9. An information processing system as recited in claim 8 including a fourth register for temporarily storing the memory address of the instruction being executed by said information processing system, means for incrementing the memory address temporarily stored in said fourth register, inhibitable means responsive to the generation of said available signal for incrementing the memory address temporarily stored in said fourth register a second time, automatic priority interrupt means randomly providing an interrupt signal, and means detecting said interrupt signal to inhibit said inhibitable means such that the memory address temporarily stored in said fourth register is not incremented a second time.

10. An information processing system as recited in claim 8 further comprising means for testing said first field of said control word temporarily stored in said third register to detect a list length condition, a fifth register, and means for transferring said second field of said control word temporarily stored in said third register into said fifth register until said list length condition is obtained, to thereby develop a modified second field in said fifth register, said combining means adding said modified second field temporarily stored in said fifth register to the operand address temporarily stored in said second register plus an additional increment to provide the identification of a second storage location.

References Cited

UNITED STATES PATENTS

| | | | |
|---|---|---|---|
| 3,197,740 | 7/1965 | Terlato et al. | 340—172.5 |
| 3,267,433 | 8/1966 | Falkoff | 340—172.5 |
| 3,297,998 | 1/1967 | Klein | 340—172.5 |
| 3,308,443 | 3/1967 | Couleur et al. | 340—172.5 |
| 3,340,513 | 9/1967 | Kinzie et al. | 340—172.5 |
| 3,351,917 | 11/1967 | Shimabukuro | 340—172.5 |

OTHER REFERENCES

IBM-7080 Reference Manual A22-6560-1—December 1961 (copy can be found in Group 230, U.S. Patent Office) pp. 14–19 and pp. 25–29.

PAUL J. HENON, Primary Examiner

HARVEY E. SPRINGBORN, Assistant Examiner